Figure 1:
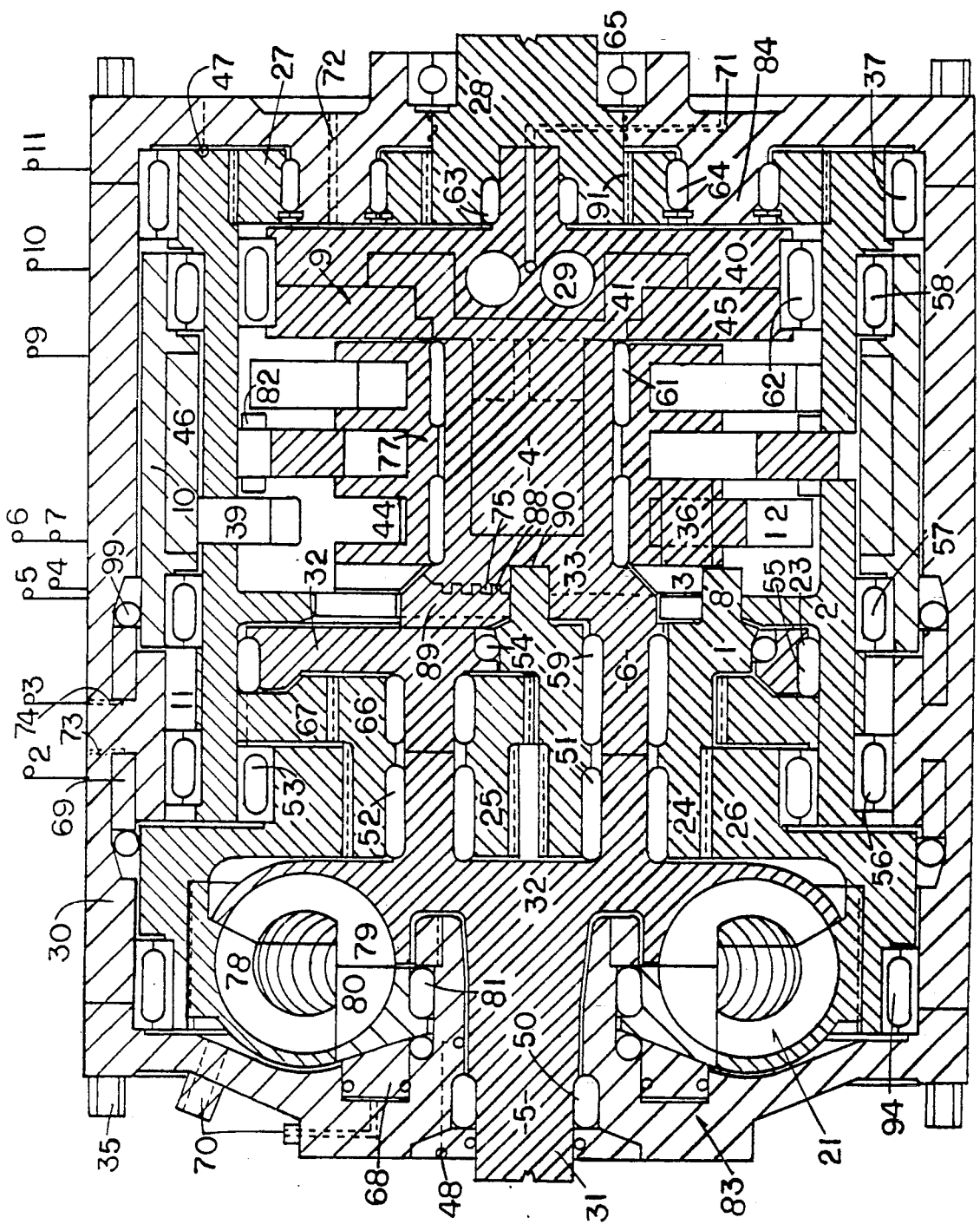

United States Patent [19]

Russell

[11] Patent Number: 5,046,995

[45] Date of Patent: Sep. 10, 1991

[54] STEPLESSLY VARIABLE POWER TRANSMISSION

[76] Inventor: Oliver J. Russell, 3560 Altamont Rd., Birmingham, Ala. 35213

[21] Appl. No.: 536,188

[22] Filed: Jun. 11, 1990

Related U.S. Application Data

[63] Continuation-in-part of Ser. No. 356,443, May 24, 1989, abandoned, which is a continuation-in-part of Ser. No. 288,947, Dec. 23, 1988, abandoned, which is a continuation-in-part of Ser. No. 47,186, May 5, 1987, abandoned, which is a continuation-in-part of Ser. No. 782,530, Sep. 30, 1985, abandoned.

[51] Int. Cl.[5] .......................... F16H 1/28; F16H 1/32
[52] U.S. Cl. .................. 475/170; 475/162; 475/166; 74/887
[58] Field of Search ............... 74/884, 887; 475/59, 475/63, 104, 162, 165, 166, 170

[56] References Cited

U.S. PATENT DOCUMENTS

| | | | |
|---|---|---|---|
| 1,524,097 | 1/1925 | Logan | 475/170 X |
| 3,103,129 | 10/1963 | Egbert et al. | 74/887 X |
| 3,159,052 | 12/1964 | O'Malley et al. | 74/887 |
| 3,255,642 | 6/1966 | Christenson et al. | 74/887 |
| 3,744,597 | 7/1973 | Crossman | 475/104 X |
| 4,170,441 | 10/1979 | Trzeciak | 475/162 X |
| 4,478,100 | 10/1984 | Sfredda | 475/166 X |
| 4,630,507 | 12/1986 | Kugler et al. | 74/887 |
| 4,699,024 | 10/1987 | Iida et al. | 475/162 |
| 4,712,450 | 12/1987 | Takamiya et al. | 475/170 |
| 4,916,974 | 4/1990 | Kozakae et al. | 475/166 |

FOREIGN PATENT DOCUMENTS

| | | | |
|---|---|---|---|
| 454640 | 10/1936 | United Kingdom . | |
| 0500233 | 2/1939 | United Kingdom | 475/162 |

*Primary Examiner*—Leslie A. Braun
*Assistant Examiner*—Khoi Q. Ta

[57] ABSTRACT

This invention is a steplessly variable power transmission, comprising: an input driven planet gear, having axially disposed teeth, confined to reciprocate in straight diametrical channels in a output driving ring gear. When the teeth also move on a straight line as related to the housing, no rotary drive can be placed on the output ring gear, and the transmission is in a neutral mode. But, when the teeth are forced to curve, as related to the housing, the output gear must rotate accordingly. For example: if the input driven teeth veer away one degree, from a straight line, while the input rotates a full 360 degree rotation, then the input-output ratio is 360 to 1 underdrive. When the teeth path is a circle, the ratio is 1 to 1, but, the extreme lows, allow built-in overdrive gearing. The preferred embodiment has a stepless range from neutral to 3 to 1 overdrive. There are numerous methods to curve the path of the input driven teeth. This application discloses two basic methods and the preferred embodiment uses a combination of the two methods.

21 Claims, 15 Drawing Sheets

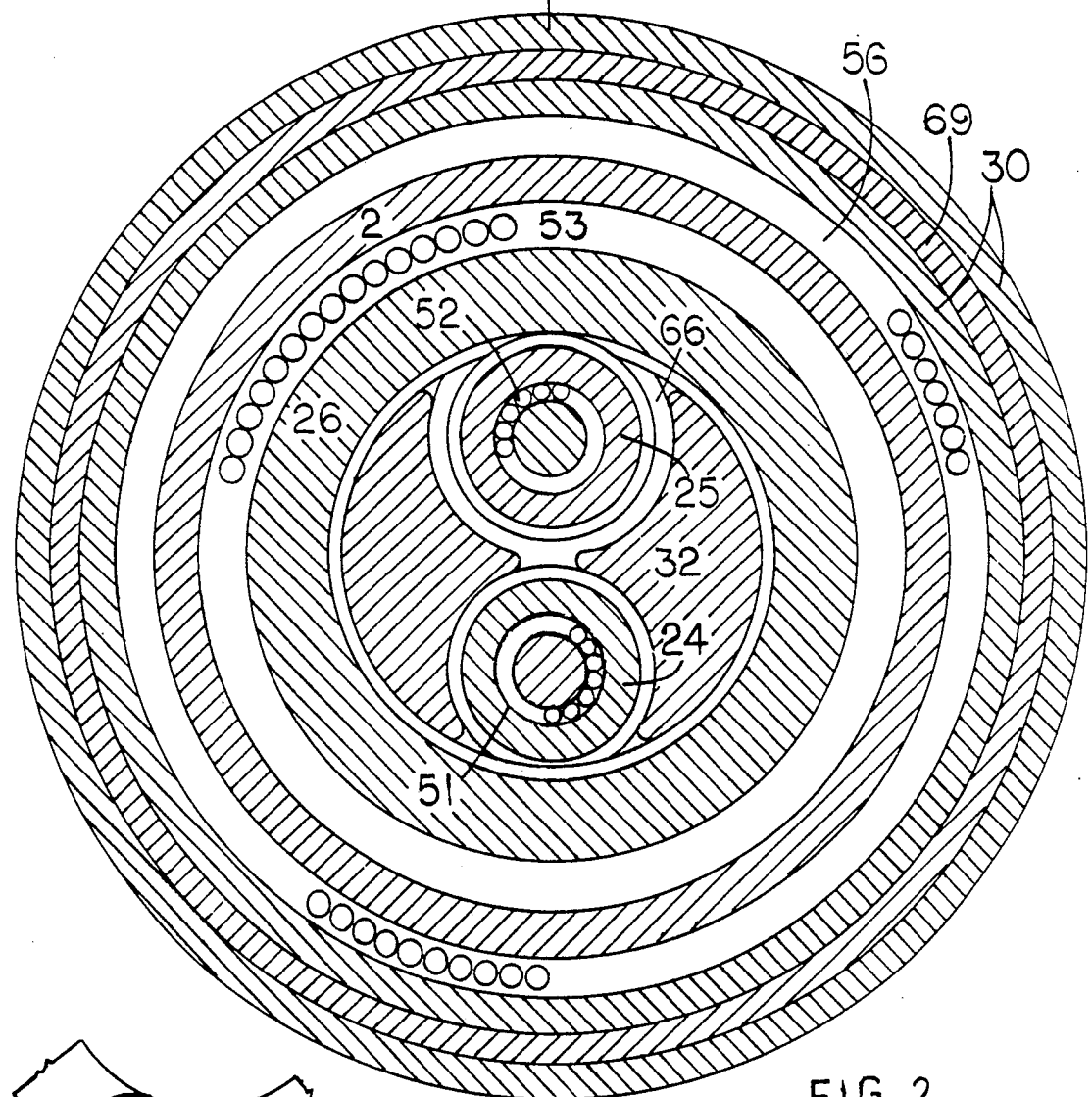
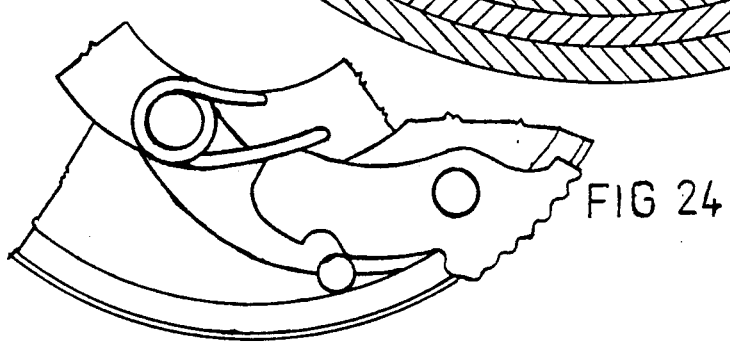
FIG 2
FIG 24

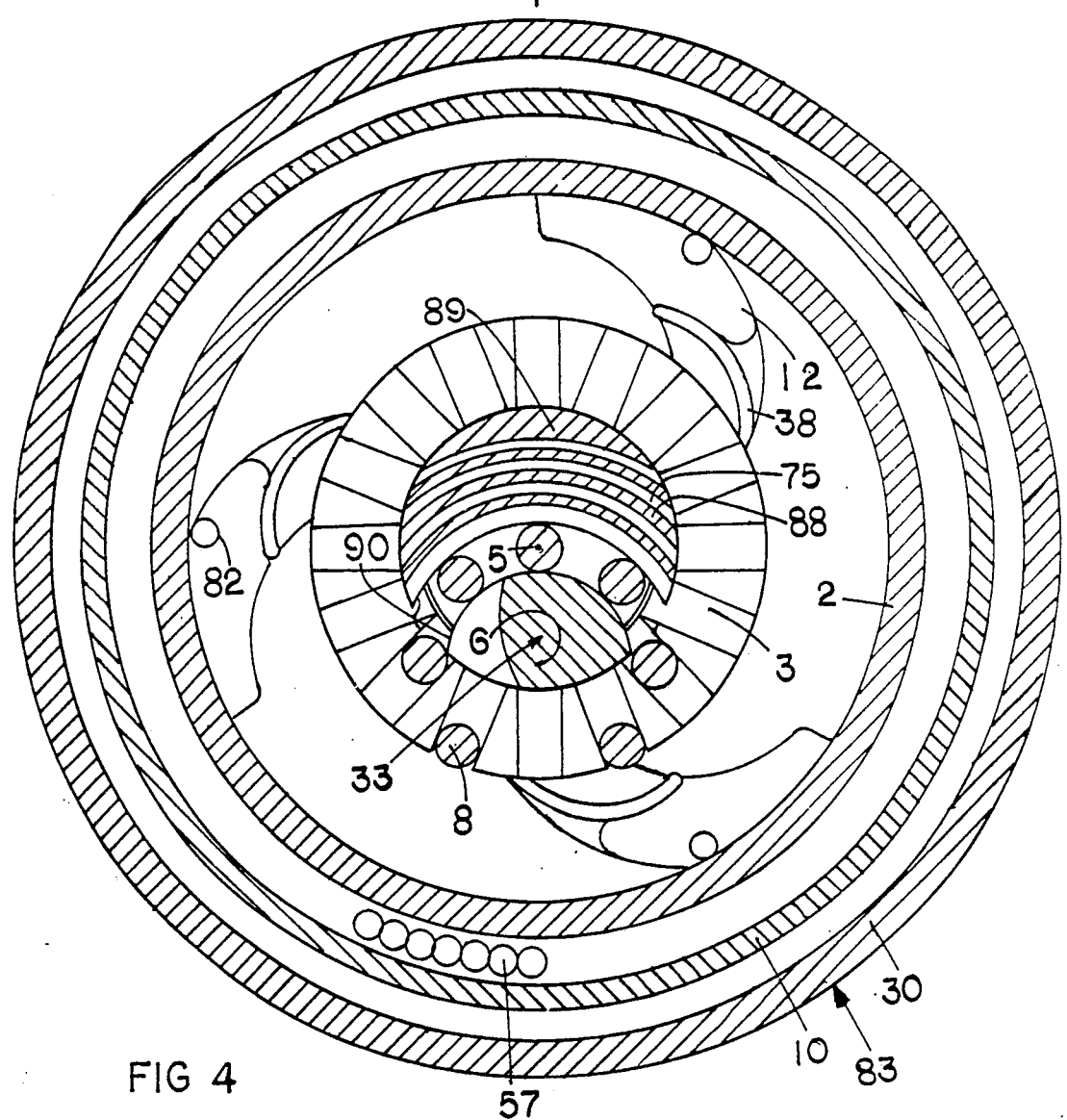

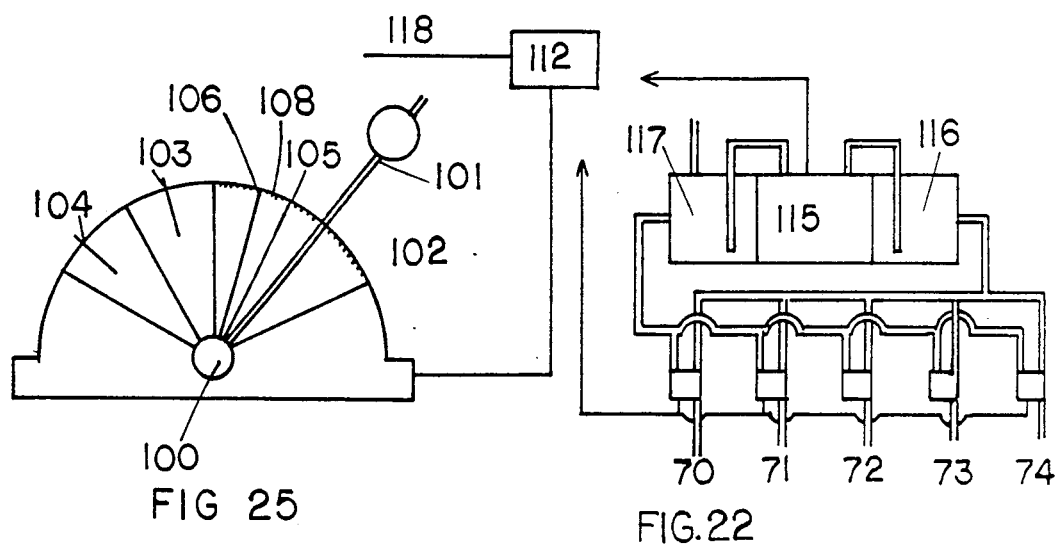
FIG 25
FIG. 22
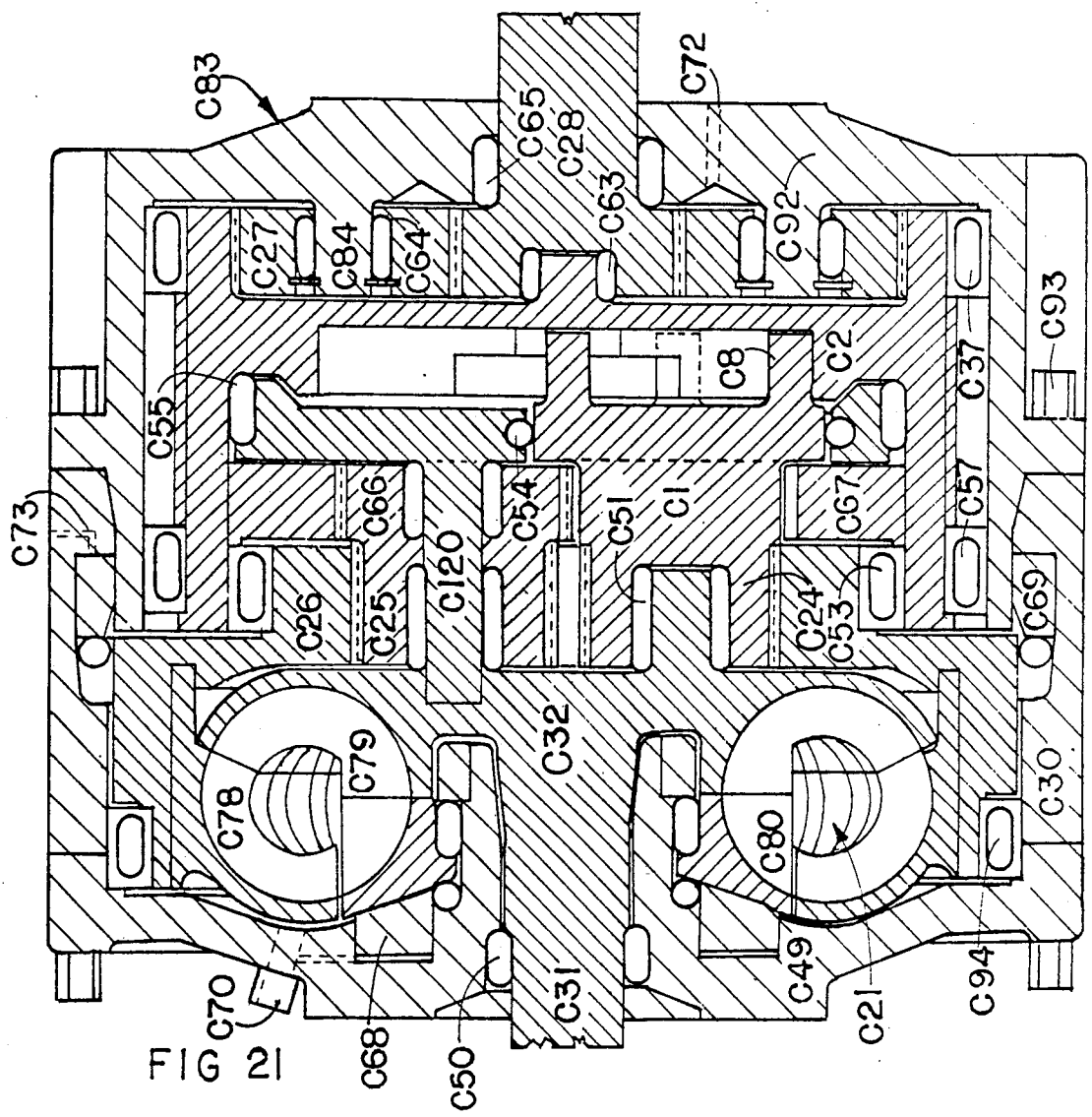
FIG 21

STEPLESSLY VARIABLE POWER TRANSMISSION

BACKGROUND—CROSS REFERENCE TO RELATED APPLICATIONS

This application is a C.I.P. of Ser. No. 07/356,443, now abandoned; 07/356,443 filed on May 24, 1989 of which was a C.I.P. Ser. No. 07/288,947, now abandoned; 07/288,947 filed Dec. 23, 1988 which was a C.I.P. of Ser. No. 07/047,186, now abandoned; 07/047,186 filed May 5, 1987 which was a C.I.P. of Ser. No. 06/782,530 filed Sep. 30, 1985, now abandoned.

BACKGROUND

1. Field of the Invention

This invention is about power transmission: more specifically, a steplessly variable power transmission. Although this invention can apply to more than half of all power driven machines it is discussed here in context with automobile power transmission.

2. Discussion of Prior Art

There is currently no way to efficiently correlate the natural laws of inertia with the art of a stepless automobile transmission. Unsuccessful efforts to invent a serviceable transmission have been continuous since the first automobile was produced. These efforts include numerous arrangements of the friction clutch method, along with endless variations of the cone method. The present invention is based on a unique and new principle, with no suggestion of precedent in the transmission annals. The low efficacy of all conventional power transmissions contribute more to air pollution and fuel shortage than does anything else. The inertial resistance to instant change of the velocity of a particle is so severe that no velocity change can occur in nature unless the change is stepless: regardless of the velocities involved. To name an instance, a drag racing vehicle makes its own stepless transmission by wasting energy at the spinning wheels. All conventional power transmissions must have a designed method of waste in order to be stepless enough to work. If the waste does not occur in a slipping power train then it occurs in the engine cylinders, via pressure variation that reduces the input torque and releases unburned carbon into the air. This condition is visible when a heavy truck is attempting to force acceleration with power glut, along with much shifting and double clutching. In this instance the exhaust contains more carbon than the engine is burning. Stepless change of motion is enigmatic in that it can be said if the change is stepless, it does not occur at all: and velocity is increased without the event of inertial resistance. Regardless of the enigma, it is sufficiently observable that stepless power transmission nearly neutralizes inertial resistance, whereas the conventional transmission, occurring in steps, creates inertial resistance that must be overcome with added input power. That is to say, barring gravity (hills and friction), it can be said that the manner in which a load is moved determines the load.

When conventional transmissions use a fluid action torque converter reduction gearing multiplies the torque that is delivered by the converter turbine. Starting the motion of a vehicle in the relatively high ratio of three to one underdrive, or low gear, is impossible without some form of slip-waste built into the system.

When the conventional transmission is in a one to one, or high gear, mode there is no gearing to multiply the turbine torque, and if the turbine is efficiently coupled and turning as fast as the input driven pump the turbine provides very little driving torque. Whereas, when acceleration is attempted in high gear, and more inertial resistance cuts in accordingly, acceleration is indeed sluggish. And, this is accomplished by an extreme power glut which is necessary to increase the converter pump RPMs ahead of the turbine RPMs enough to generate some torque to change the vehicle velocity. Since typical driving conditions require frequent acceleration in high gear, it is shown to be a very wasteful factor.

It seems to be a well perpetuated secret that the number of vehicles in use is NOT the irreversible cause of air pollution and the energy problems now existing. The problem is related to the make shift machines that are only half doing the transmission job.

Another impediment to solving the fuel and pollution problem is the resistance to change on the part of established producers. For the most part, due to the mental strain and the material costs of retooling. This resistance is fortified by the irresponsibility that is inherent to the fashionable, short term thinking.

A driving engine puts out mechanical energy in the form of torque and RPMs. The RPMs in the upper three-quarters of the engine range are subject to a degree of operator control by the variation of the fuel input, or acceleration, but the engine torque is not subject to operator variation or control, except as it naturally relates to the RPMs. The conventional systems of automobile power transmission provide the operator with a workable range of speed selection but are seriously lacking in the ability to provide an efficient output drive. The output load is composed mostly of inertial and gravity resistance and the driving torque requirements for a given speed, or change of speed, varies nearly continuously. That is, the most efficient torque to RPM ratio varies almost constantly. The number of useful torque to RPM ratios within a common range of driving conditions is infinite, but a conventional power transmission can only provide three or four torque to RPM ratios. Therefore, the ratio is seldom correct in an efficient manner. The vehicle cannot move without sufficient torque, so the engine must supply excess fuel and power which, most of the time, is wasted into the air as pollution and heat. This power glut has an adverse effect on engine combustion, thereby exhausting more unburned carbon.

Conventional power transmission does not have the low and stepless ratios to handle the starting loads of extensive and permanent over-drive gearing. Whereas, a vehicle with a conventional transmission, driving on gentle terrain and at cruising speeds, is using only a fraction of the input power generated by the engine because the output, with its range limited to a one to one ratio and carrying little, if any, inertial and gravity loads cannot digest the energy that is essentially generated by an engine that is forced, by the absence of overdrive gearing, to rotate as fast as the output. This excess combustion, along with the associated low quality burn that is due to low pressure, contributes substantially to excess fuel use and that is the major cause of air pollution.

With the present invention acceleration is efficiently accomplished by the smooth and stepless upward change of the ratio while the input RPMs is appropriately increased at the same time. The conventional transmission accelerates by glutting the system with input torque, in one ratio, to get output RPMs up to a speed that reduces the inertial resistance enough for the next higher ratio to handle the load. The same highly inefficient process is repeated two or three more times.

The following analogy, while possibly incorrect in measure, is definitely correct in principle: a hypothetical automobile is equipped with a one ratio, or low gear, transmission. Barring speed, it could do everything a conventional transmission does, but with a lower degree of efficacy. The performance and efficiency of the present invention, that is the steplessly variable power transmission, is advanced over the conventional three or four ratio transmission in an equal amount as in the hypothetical situation.

The public is not yet aware that the major source of air pollution and excess fuel use is due to the primitive state of the power transmission art and its secondary influence on the engine combustion. But, it is well known to those truly skilled in the art and it is also known that a good stepless transmission can reduce the fuel use and pollution, per mile ratio, by at least fifty percent. A recent unsuccessful effort to produce a serviceable stepless power transmission was based on the German patent of Manfred Koser. Koser's work involved the very old cone system. More specifically, the method used cones back to back, generally called the split pulley, to vary the pitch diameter of the driving, and driven pulleys to vary the input to output ratio. The latest portion of red herring served up by supporting magazines is that the transmission is okay, but it makes too much noise.

The stepless hydraulic system with a variable pump driving a hydraulic motor is serviceable in low speed applications such as some types of construction equipment. A high RPM hydraulic motor that can also provide starting torque requires the movement of more fluid than is practical in automobile power transmission.

The state of the art in railroad power transmission involves a combustion power source that is delivered to the output via electric motors that provide a magnetic type starting torque that is related to the electric output of a diesel driven generator. Nothing in the transmission can devise a low enough ratio for one engine to start the train so two, three, or four engines are hauled about in useless tow for the occasional event of producing enough torque to start the train in a relatively high ratio.

The present invention provides infinitely low ratios and can start any train with the same power source that pulls it at high speeds. This can eliminate the use of more than fifty percent of the engines now in rail service.

The power transmission producers throughout the industrial world refer to conventional planetary transmissions and stick shift truck transmissions as efficient machines. And, they look to engines and other red herring sectors to reduce fuel use and air pollution. A rudimentary understanding of inertia and the data contained in this application provides the basis to prove that the conventional power transmission is, in fact, the culprit that is responsible for more fuel waste and air pollution than all other industrial factors combined.

MAIN OBJECTS OF THE PRESENT INVENTION

The main objective of this work is to substantially reduce excess fuel consumption and air pollution. In conventional automobile transmission there is a low degree of correlation between engine input power and the transmission output load due to the opposition to the natural laws of inertia by the conventional system. This lack of correlation is conventionally managed by the over-production of power that is dissipated, by design, to make the drive and driven work, albeit inefficient. In other words: due to the conventional make-shift automobile transmissions more fuel is gone to waste than actually used, and this waste is the source of more air pollution than all other sources combined. The public has been brainwashed into accepting conventional power transmission as the unavoidable norm.

The constant variables in an automobile drive train require a steplessly variable transmission with a substantially extended range to precisely correlate the input power with the output load and eliminate most of the aforementioned waste. An objective of this work is to implement a stepless transmission that will provide the aforesaid correlation without tradeoff characteristics that would delay its manifestation. Also, to provide such desirable performance that current owners of vehicles will voluntarily exchange their conventional air polluting transmissions for the steplessly variable power transmission. Acceptance of the present stepless transmission by vehicle owners is the fastest way to reduce air pollution and fuel waste. These drivers will respond to the fuel economy, maintenance, and installation costs. The public's motivation to reduce pollution will be greatly inspired by the exciting performance of the present steplessly variable power transmission, as opposed to the public resistance and distrust of the placative catalytic converter. The beforementioned exciting performance includes the quality of smooth, phenomenal, acceleration that occurs during the stepless increase of ratio in simultaneous balance with the increasing input RPMs. The near neutralized effect of inertia is a pleasant experience for the driver of any vehicle. Due to the fact that the wheel spinning phenomena of the conventional transmission is eliminated by the present invention, the infinitely low and stepless ratios provide many other new and exciting capabilities such as an increased ability to ascend sharp inclines in mud or snow.

Innate objectives of the present work are to substantially reduce the number of parts, the size, the weight and the cost. Also, to eliminate parts such as friction clutches that have a short longevity. The over-all objective is to produce a solidly superior transmission that will insure public enthusiasm and demand. A dubious aim is to provide the American automobile producer with the opportunity to reverse the present trend toward foreign domination of that market. Another goal is to provide the substance with which to improve the American position in the world economy. The international market for all forms of stepless power transmissions has been estimated as beginning at fifty billion dollars annually. The object here is to awaken the sleeping managers of the American automobile industry before the trend toward following, rather than leading, becomes irreversible. The awakening that occurred when the foreign compact auto invaded the market was mild compared to the coming shake up from a sudden fifty percent drop in fuel consumption.

Further, this invention could provide a basis to broaden the scope of old industries such as pipeline pumping. This industry in presently limited, and, is handicapped by the lack of machinery capable of handling higher starting loads. Also, new industries are made more practical by the present invention. For example, a design for deep ocean floor mining, already in existence, is based on the present invention's ability to surpass the previous limit on managing starting loads.

This steplessly variable power transmission is a contribution to the health of the world's inhabitants and has no disadvantages or tradeoffs since it involves a new and basic concept. Evolvement into new and undetected advantages is a natural probability. Many subtle and interrelated advantages are more comprehensively discussed in context with the following general discussion and in the structural and operational sections of these specifications.

The present invention comprises three basic functions but each function can be accomplished with elements that vary in number, design, and medium. Variation in the implementation of these elements remains within the scope of the present invention but varies the strength of the transmission as well as a corresponding cost and size variation.

The three basic functions in context with three performing elements are: 1) an input driven first gear, with axially disposed teeth, reciprocating on diameters of; 2) an output driving gear and, 3) a transitive connection between the first gear teeth and a reaction base that steplessly restricts, and varies, the rotation of the first gear teeth, around the first gear axis, while the first gear axis rotates around the second gear axis, whereby, the path pattern of the first gear teeth is steplessly changed and this steplessly changes the input-output ratio.

Figure 19:
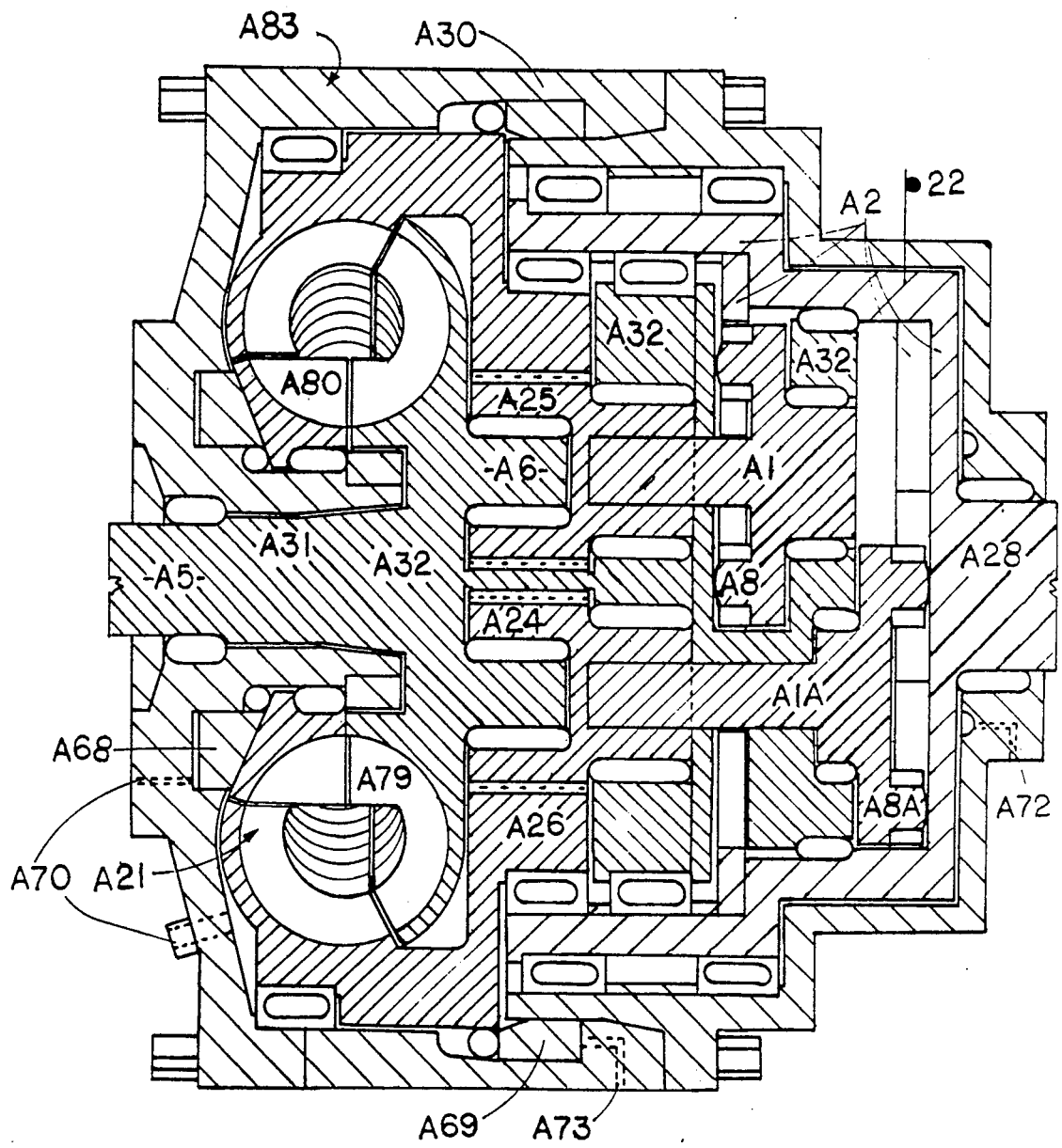

In other words, the three basic elements that perform the three basic functions are: a first gear; a second gear; and a transitive connection to a reaction base (housing). In the preferred embodiment the input drive, from the engine, directly rotates the transmission pump, the carrier and the control unit 9, so the reaction base for this pneumatic drive, on these units, is the engine cylinder head. Of course, the input power is variable according to the accelerator. But, an objective of this invention is to precisely and efficiently allocate a torque to RPM ratio according to a variable output load, and this objective is accomplished by the present transmission's ability to steplessly change the path pattern of the first gear teeth. The straighter patterns provide higher torque and lower RPMs, while the path evolves through elliptic and more rounded patterns, to provide higher RPMs with less torque. Since the input torque to RPMs composition is reallocated in the transmission the transmission drive train provides a reaction basis for the force that changes the path of the first gear teeth. The variable disposition of a reaction base, and the transitive connection to it, provide substance for a multitude of variation designs, within the scope of the invention. For example, the preferred embodiment provides a mechanically linked transitive connection from the first gear teeth to a reaction base (housing), via the third gear guide channels, the swivels, and seat 10. Also, pistons 29 hold the third gear axis 4 on orbit 22, and the reaction base for the fluid pressure on pistons 29 is a high pressure reservoir. Yet another accessorial restriction on the rotation of the first gear teeth 8 comes from the restrictor turbine. Finally, the first gear axis 6 is driven directly by the engine. To clarify: there are four contributories to the power train in the preferred embodiment. And, variation in number or position of these contributories indicates a variation of the transmission, within the scope of the invention. A transitive connection to a reaction base is called the third basic essential to the invention. A variation, within the scope of the invention, of the third basic essential, is seen in variation A, as shown in FIG. 19, sheet 12. Here, in variation A, the entire third gear mechanics is omitted, and this includes the third gear 3, the swivels 12-20, the control unit 9 and seat 10 with its tire 46. Whereas, a part of the restriction load from the first gear teeth is carried by the force from restrictor 21. Here it is again emphasized that a substantial part of the drive train goes through the direct engine driven rotation of the first axis 6.

Conventional transmissions, driven with a conventional torque converter, passes the entire drive from the input driven pump to the output driving turbine, by fluid dynamics excepting that some late model vehicles lock the output to the engine in the highest ratio. Stock car racers use a straight-through drive, and the lack of fuel efficiency in race cars is widely known.

Figure 20:
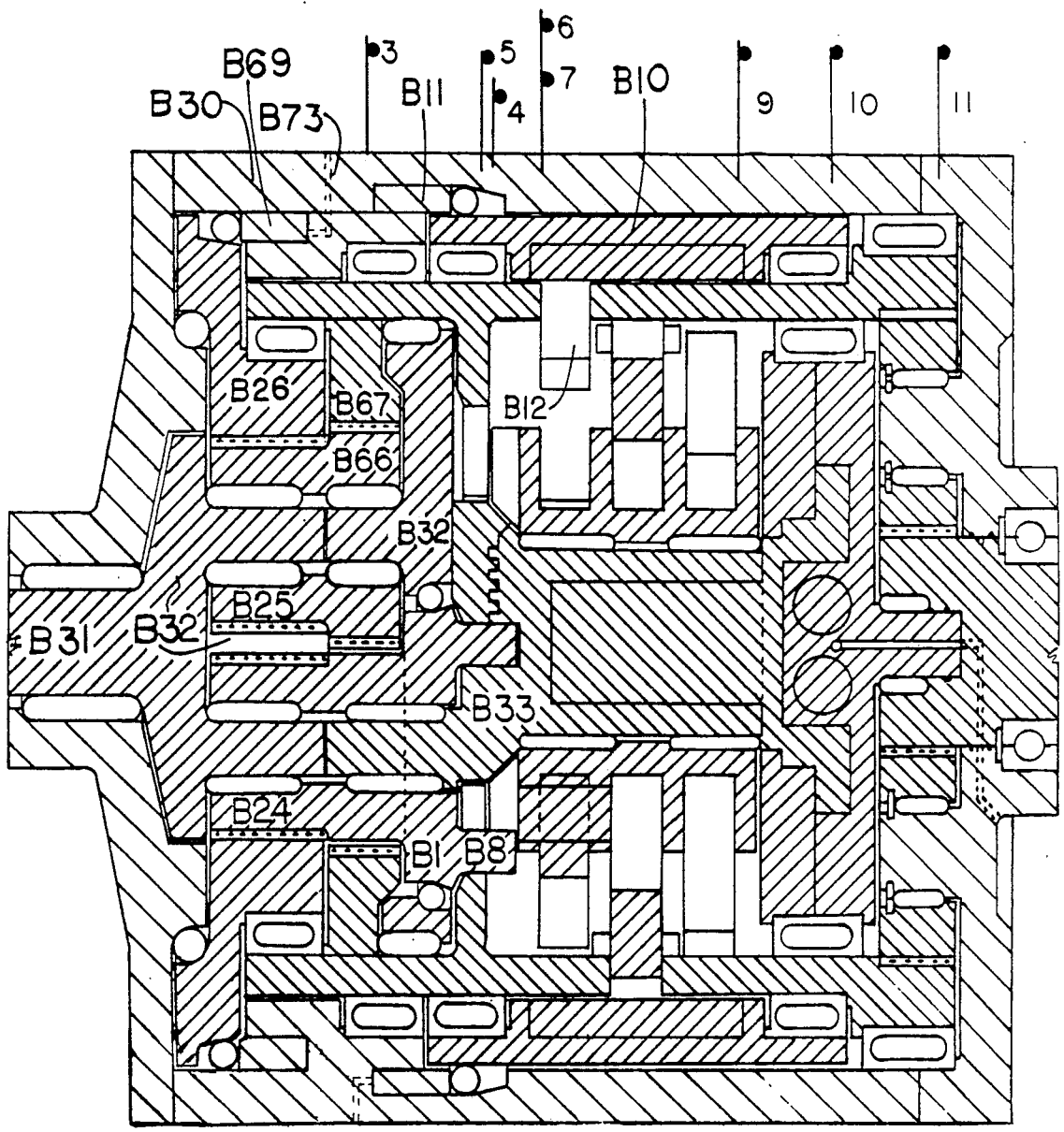

The present variation A also shows how the first essential, that is a first gear 1, may vary in number and position, and still remain within the scope of the invention. FIG. 19, sheet 12, shows two first gears, and in accordance with this, additional gearing is added to the second essential. That is, the second gear 2. All gearing fastened to the multi-meshed second gear cylinder is called the second gear 2. Variation B omits the restrictor 21 and the third essential is largely provided by the third gear guide channels and their supporting mechanics which include the swivels 12-20 and seat 10. But, smaller portions of the reaction load are carried by oil pressure behind pistons 29, and the direct engine drive on the first gear axis 6. Except for the omission of the restrictor 21, variation B is similar to the preferred embodiment. Variation B is shown in FIG. 20, sheet 13.

Figure 23:
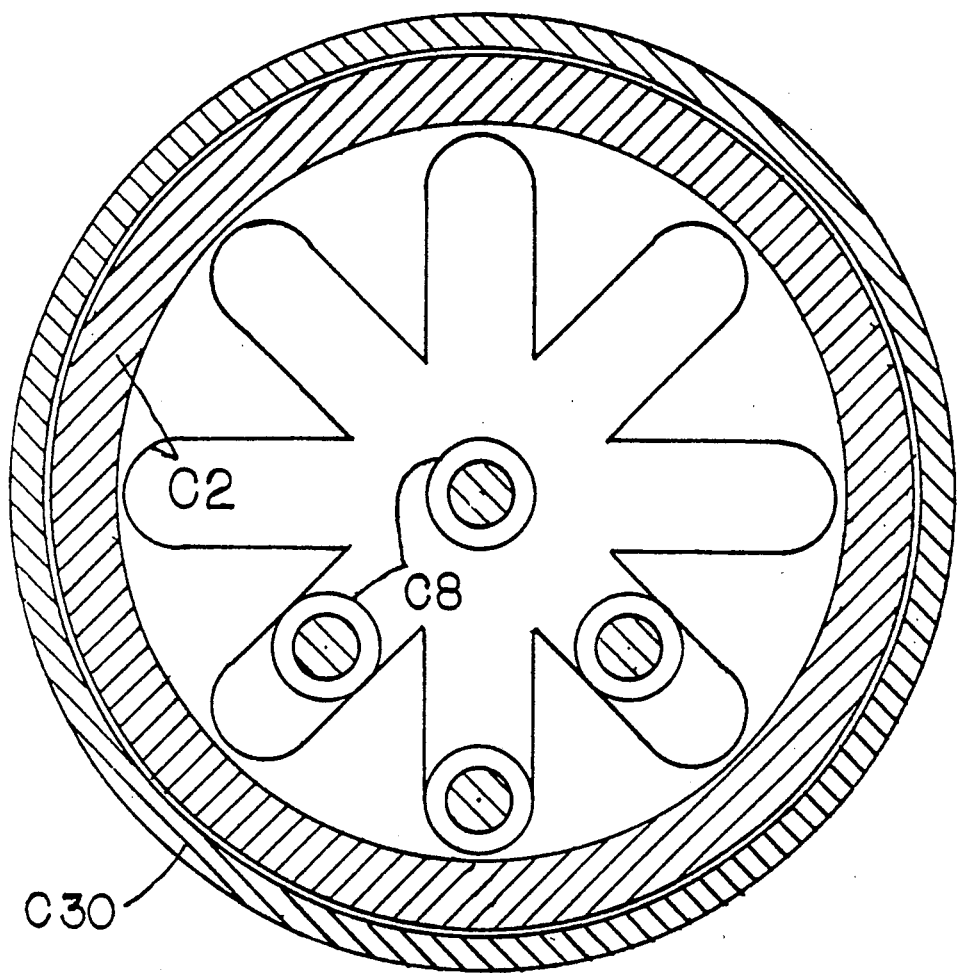

Variation C of the present invention is shown in FIG. 21, sheet 14. This variation is similar to variation A excepting that variation C has only one first gear 1 and has the double depth second gear channels as shown in FIG. 23, sheet 15, in order to provide more contact between the first gear teeth and the second gear channels. Also, variation C has over-drive gearing. Extreme reduction occurs as the first gear teeth move on nearly straight lines, and multiplies the input torque accordingly, during the low starting ratios. The diametrical bias of teeth 8 is driven directly by the engine input, and the reaction base for this portion of the drive is the engine cylinder head. A fluid restriction, against the rotation of teeth 8, around their first gear axis, provides a variable drive that automatically adjusts the input torque to the output load. That is to say, when the output torque load increases, the path of teeth 8 becomes straighter, producing more torque and less RPMs. And, a constant speed is maintained by accelerating the input engine. But, as the output torque load decreases, the path of teeth 8 evolves toward more elliptic, rounded patterns to increase the output RPMs, and in order to maintain constant speed the input RPMs are reduced. It is an inherent characteristic of this variation C to evolve, in a biased fashion toward the highest output RPMs that are driveable by the input torque. Torque cannot occur without resistance, and torque is measured by the resistance that it overcomes. To qualify: the present transmission provides the highest output RPMs that can be driven by the input torque, thereby using almost all of the energy released by the engine combustion. In any event, it is damaging to the ecology that conventional power transmission, coupled with a combustion engine, releases combustion energy that is mechanically oblivious to its output disposition at the wheels of the vehicle. This essential to the system requires excess fuel to be dissipated into air polluting waste and heat.

The amount of turbine torque that a fluid power transmission can generate is primarily related to the coexisting difference in the pump and the turbine RPMs, whereas the present restrictor 21 is capable of generating more torque on a moving turbine than a conventional converter type turbine because the present turbine 78 always rotates about one-third the RPMs as that of the output shaft. The conventional turbine rotates three or four times faster than the output shaft: this is made possible by the extreme low ratios provided by diametrical gearing.

In variation C of the present invention the overdrive gearing multiplies the load on gear 1 from gear 22 accordingly. The restrictor turbine provides a torque force that restricts the rotation of teeth 8 around the first gear axis 6, while an input shaft drive rotates axis 6 around axis 5. This input shaft drive forces the teeth 8 to reciprocate in the diametrical channels of the second gear 2, so that an extreme torque drive is placed on the output second gear, that overrides and minimizes the load from the overdrive gearing.

The drawings indicate that implementation of the invention requires at least three elements to execute three basically essential functions. The first element and its function is an input driven first gear with its teeth reciprocating in diametrically disposed channels of the second element. This second element and its function is an output driving second gear, with diametrically disposed channels, receiving the first gear teeth. The third element is a transitive connection, between the first gear teeth and a reaction base. This transitive connection changes the path pattern of the first gear teeth, to change the input to output ratio.

Although the basis of the invention is contained in these three elements and functions, the design variation of each element and variations of numerical and positional combinations of the elements provides substance for unlimited transmission designs within the scope of the present invention. That is: the character of the first gear element is not lost in variation A, where two input driven first gears share the same elemental function, and the second gear element maintains the same function, regardless of how many meshes are fastened to the second gear cylinder.

A distinction of the heavy duty preferred embodiment is that the third elemental function is split into four circuits to provide a transitive connection between the first gear teeth 8, and a static reaction base. The first circuit is a transitive mechanical connection between teeth 8 and the housing 83, via the third gear channels, on through swivels 12-20 and seat 10 to housing 83. The second circuit is a transitive connection between teeth 8 and a static reaction base, via the third gear channels on to pistons 29 that are further connected by fluid pressure to a pump reservoir. The third is a mechanical connection between teeth 8 and a static reaction base, via the first gear axis 6, on through carrier 32 and input shaft 31 to an engine cylinder head. The fourth circuit is a transitive connection between teeth 8 and a reaction base, via the first gear connection to gear 25, on through gear 26 to a fluid connection to stator 80, and also the engine head via restrictor pump 79.

A purpose of the aforesaid four circuit connection, to reaction, is to balance the strength of the transitive connections, with the driving contacts, between the input, and the output second gear 2. It is shown in FIGS. four (4), five (5), twenty-two (22), and twenty-three (23), that all of teeth 8 are driving at all times, and most of the teeth are placing a direct drive on the output second gear 2. The first gear also drives the second gear indirectly, via the balance gear 66, meshing with the standard teeth part 67 of the second gear 2.

The preferred embodiment can steplessly transmit driving power in three ways: 1) with the restrictor neutralized and the third gear in action; 2) with the restrictor in action and the third gear neutralized; and 3) with both the restrictor and the third gear in action.

A FIGURE INDEX OF THE DRAWINGS

The drawings used in this application to define the present steplessly variable power transmission include twenty-five numbered figures that are drawn on fifteen numbered sheets. Below, included with each reference figure number, is a brief orientation of the respective drawing. The drawings are explained in detail and in proper context at various other sections of these specifications.

FIG. 1, Sheet 1: Shows an axial section view, taken through a diameter of the preferred embodiment, when the transmission is in the neutral mode.

FIG. 2, Sheet 2: Shows a section view taken perpendicular to the axis of the preferred embodiment. This section is taken in the area of the input gearing, at the exact location that is indicated by the section marker 2 on sheet 1.

Figure 3:
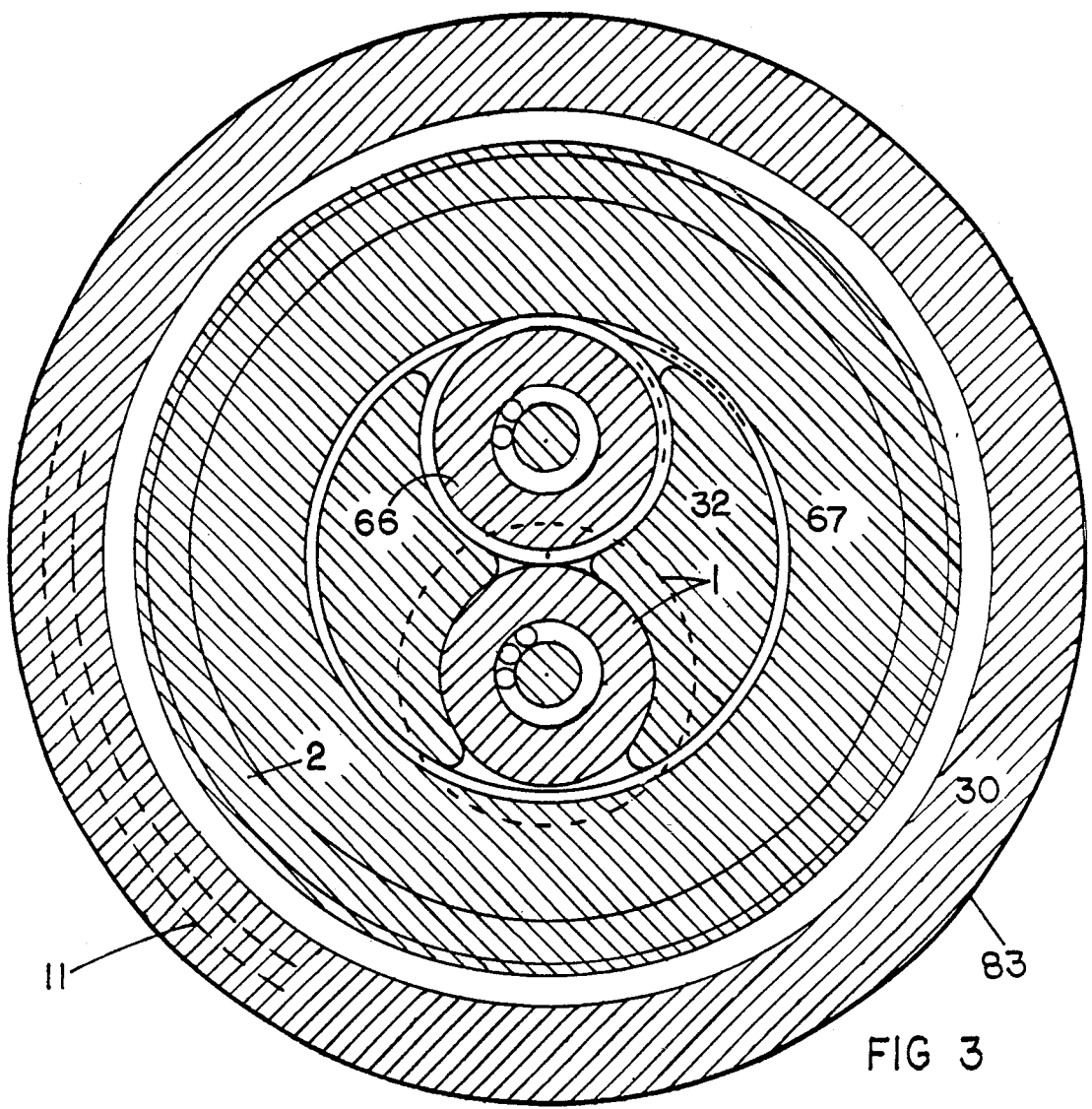

FIG. 3, Sheet 3: Shows a section taken perpendicular to the axis of the preferred embodiment, as shown by section marker 3, and the section shows more detail of the input gearing.

FIG. 4, Sheet 4: Shows a section view taken perpendicular to the axis of the preferred embodiment at the location indicated by section marker 4 on sheet 1. This section is taken when the transmission is in the neutral mode.

Figure 5:
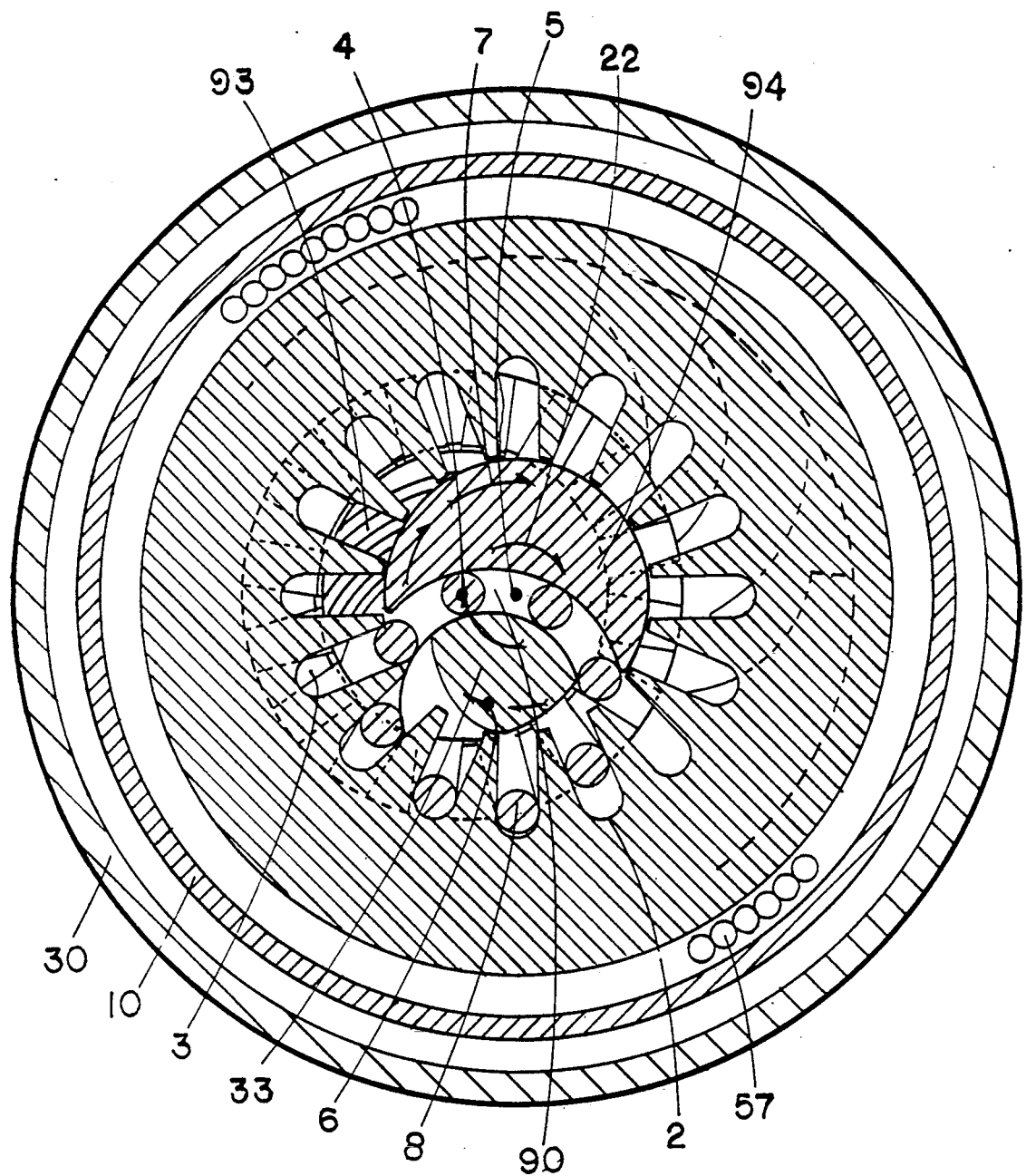

FIG. 5, Sheet 5: Shows a section view taken perpendicular to the axis of the preferred embodiment at the location that is indicated by section marker 5 on sheet 1. This section was taken at the same place that section 4 was taken, but the transmission is in the forward mode and the ratio is about 1.33 to 1 underdrive.

Figure 6:
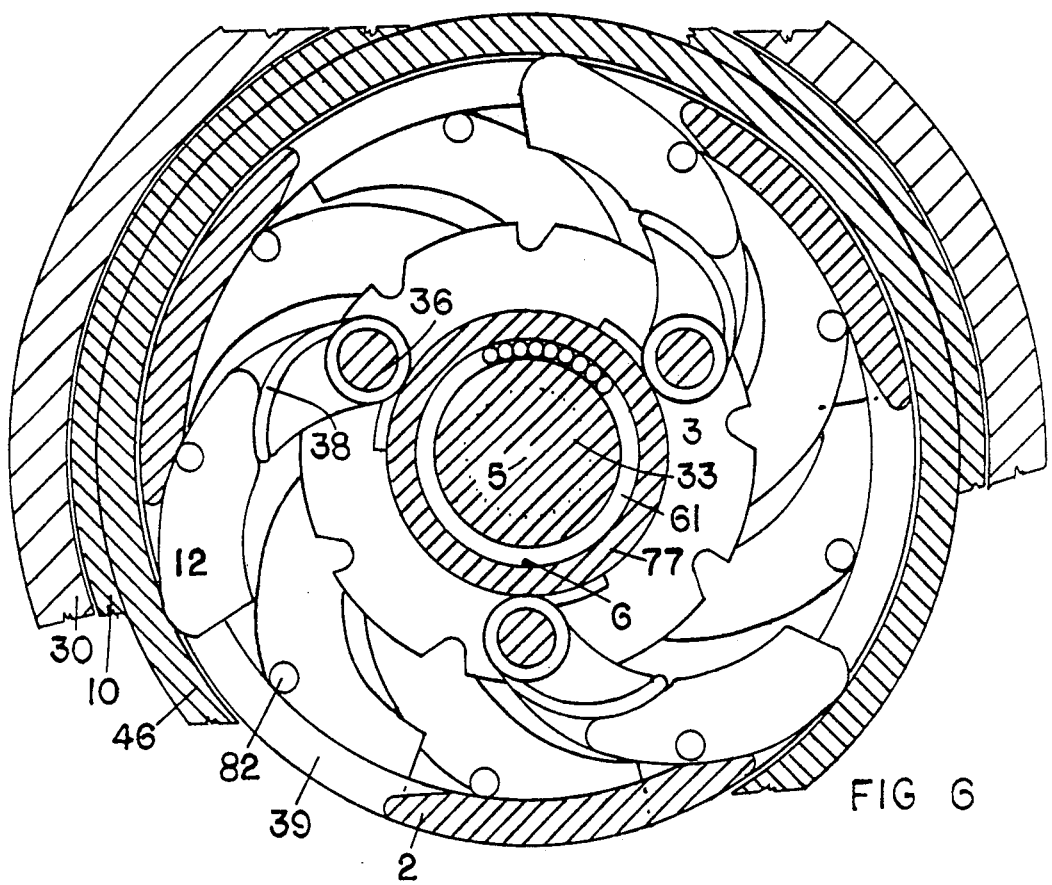

FIG. 6, Sheet 6: Taken as indicated by section marker 6 on sheet 1. This section section indicates that all swivels bear on the static reaction seat 10 via tire 46, when the transmission is in the neutral mode, and axis 4 is aligned with axis 5.

Figure 7:
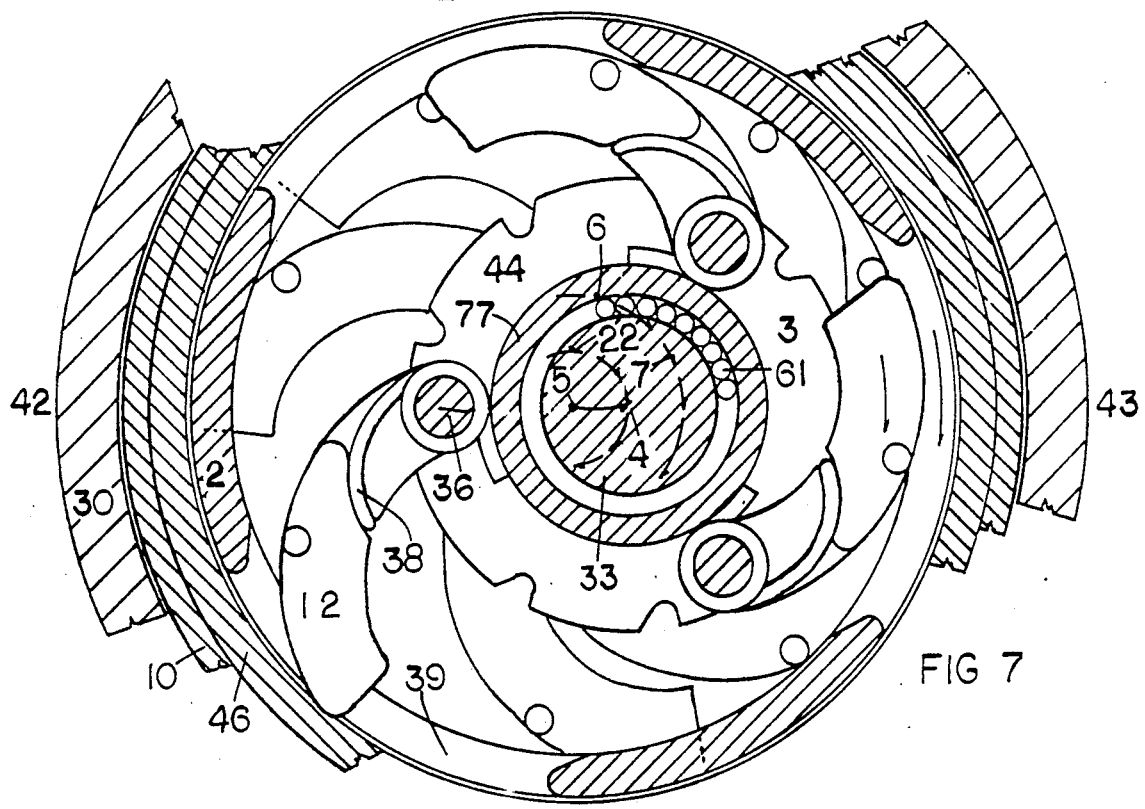

FIG. 7, Sheet 6: This section view occurs at the same place as section 6, above, but the transmission here is in the forward mode, and in an input-output ratio of about 1.33 to 1 underdrive.

Figure 8:
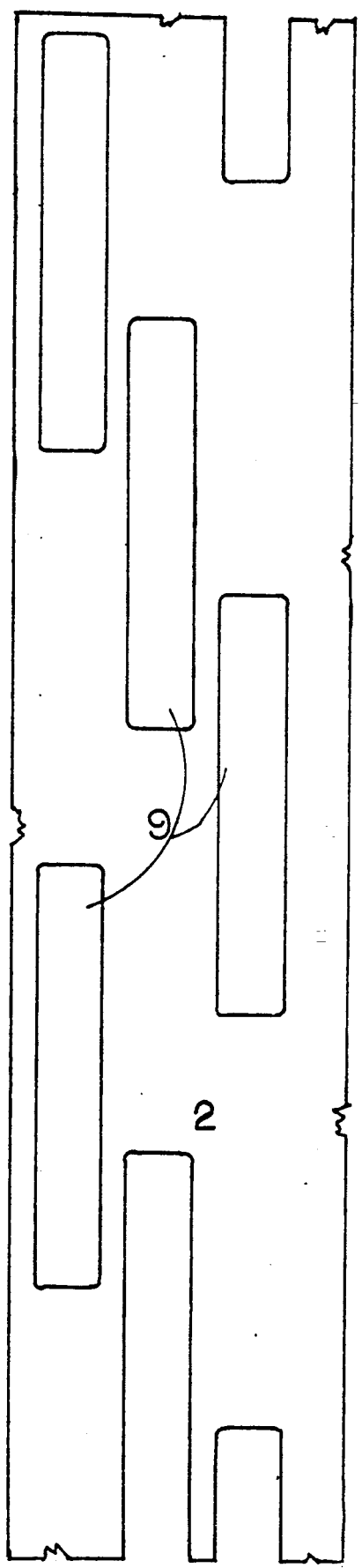

FIG. 8, Sheet 7: This detail is a partial section view of the preferred embodiment showing a part of the second cylinder in a hypothetically flat projection, to indicate the disposition of the slots 39, that allow swivels 12-20 to seat and hold, or lift and ride the second gear, to provide the swivels with their anti-friction rocker action. The sprag action of swivels 12-20 occurs when the swivels reach through slots 39 and seats on seat 10.

Figure 9:
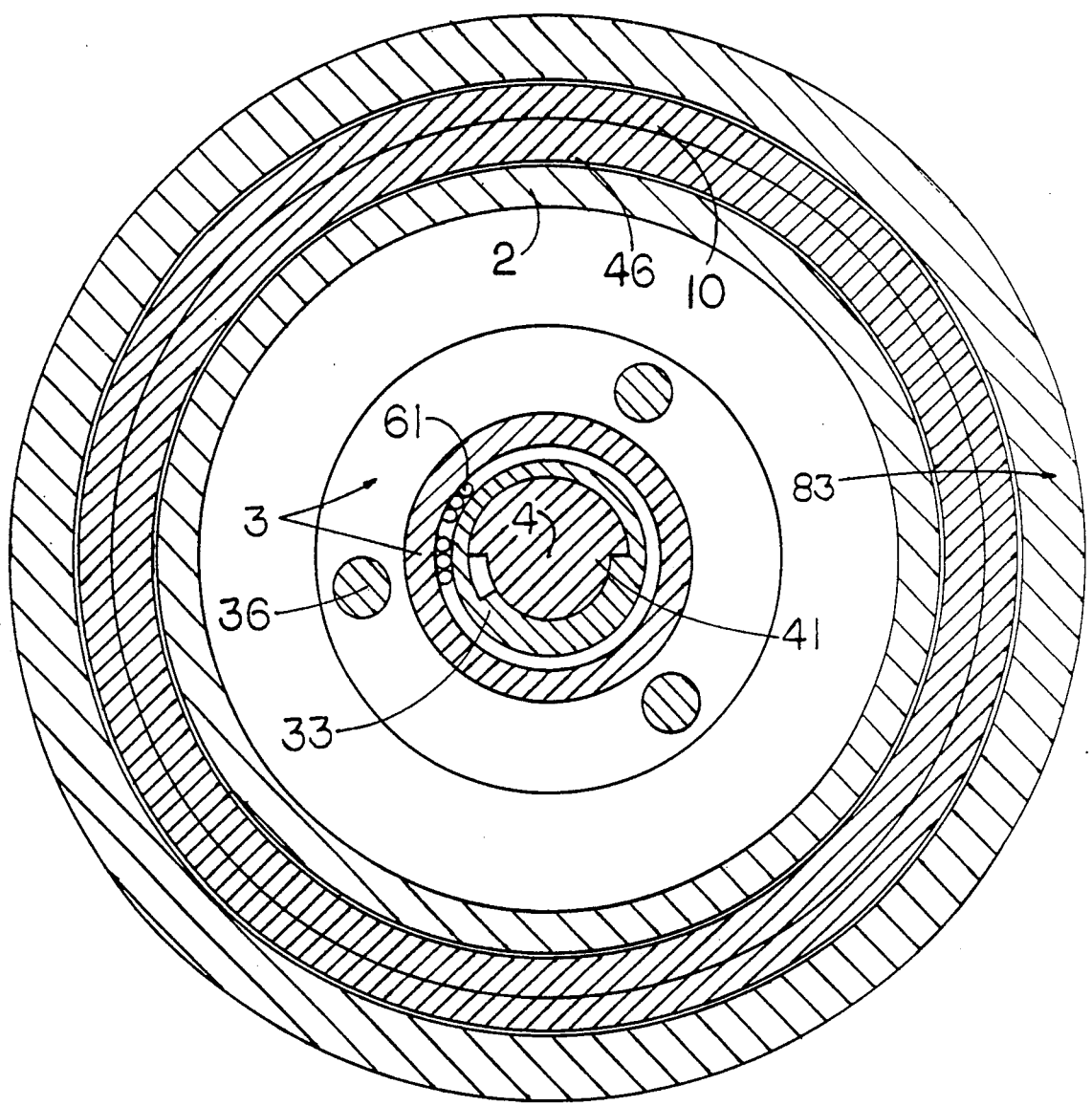

FIG. 9, Sheet 8: Shows a section view of the preferred embodiment as indicated by section marker 9 on sheet 1. This detail shows the driving connection between crank 33 and control unit 9, during the neutral mode.

Figure 10:
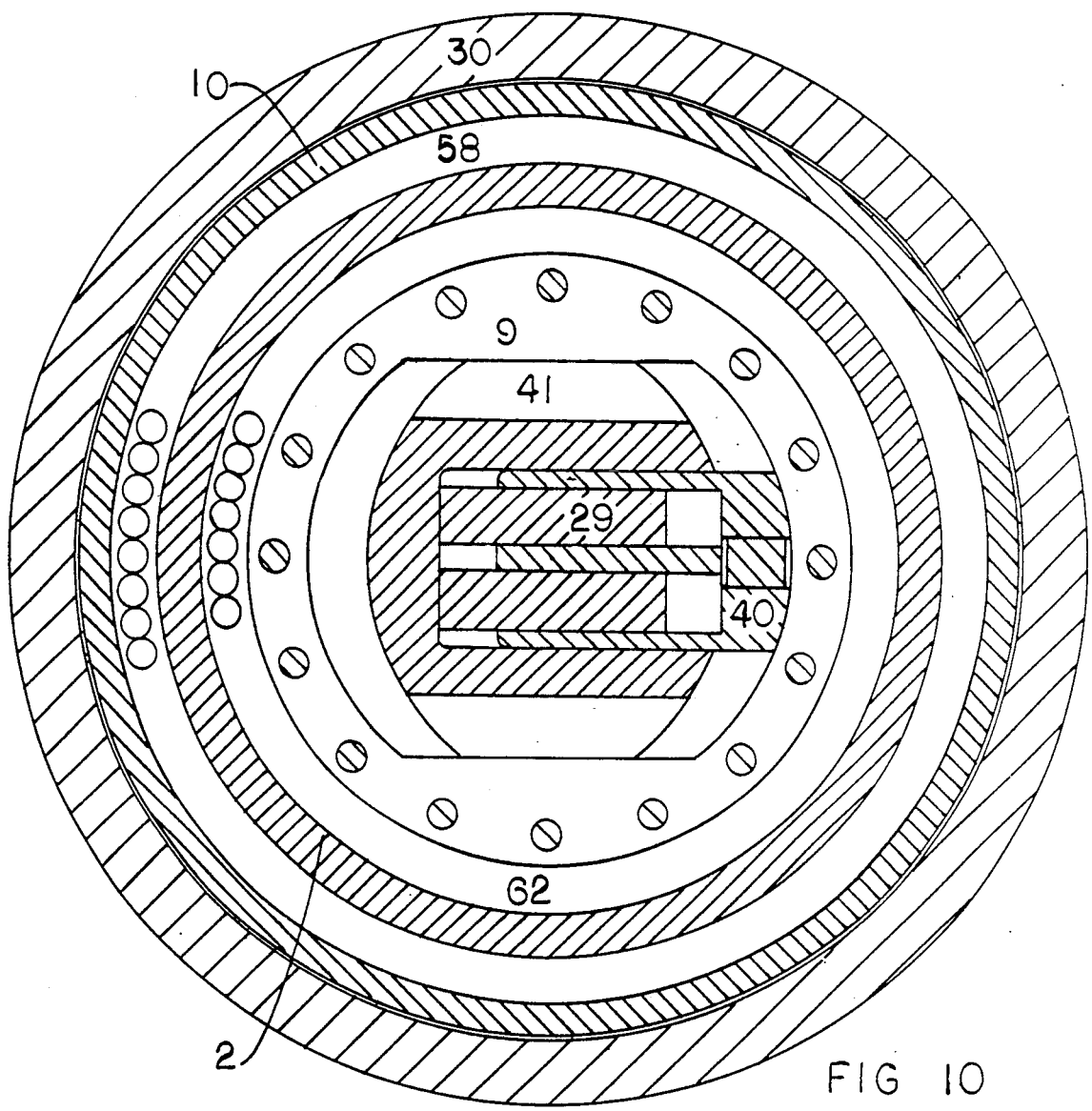

FIG. 10, Sheet 9: Shows a section view of the preferred embodiment as indicated by marker 10, sheet 1.

This detail shows how the control unit 9 moves axis 4, via pistons 29.

Figure 11:
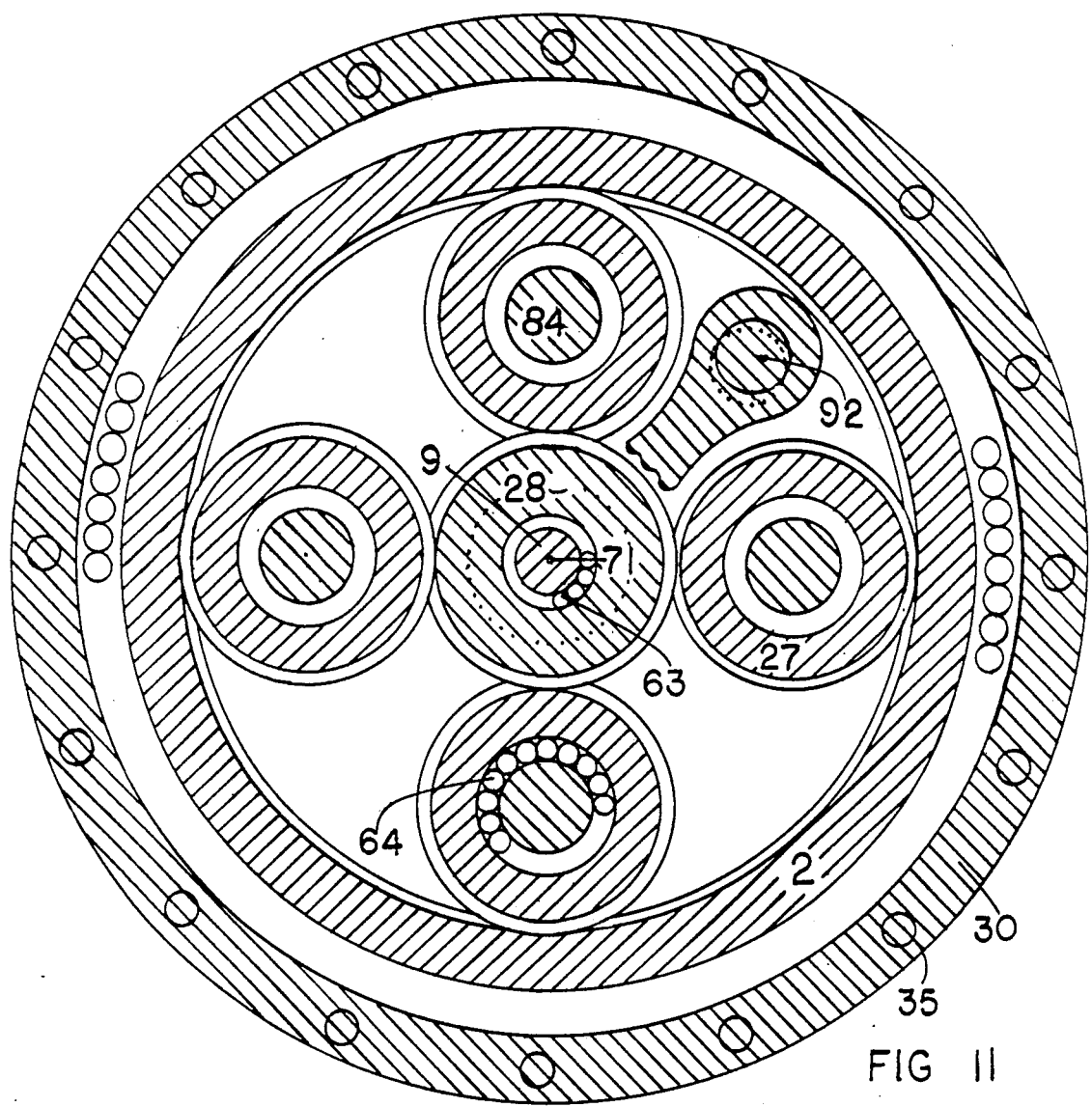

FIG. 11, Sheet 10: Shows the section view as indicated by the section marker 11, sheet 1. The detail shows overdrive gearing and a parking lock device.

Figure 12:
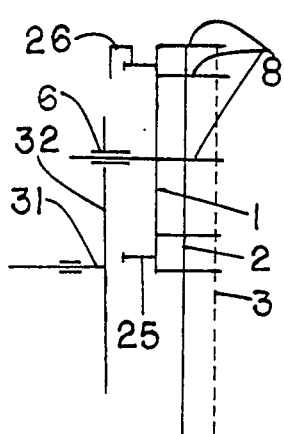
Figure 13:
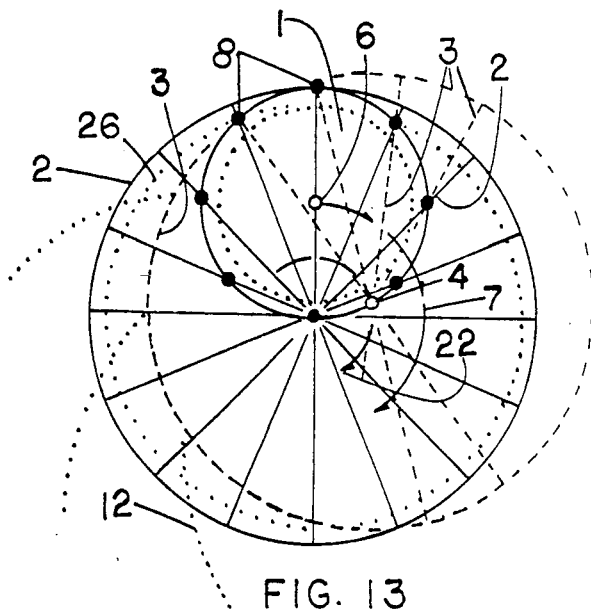

FIGS. 12 and 13, Sheet 11: Show a section view and an elevation view of the same diagrammatic detail that indicate the three basic essentials of the invention. The shown first essential is an input first gear, with axially disposed teeth, that are confined to movement on diameters of the second essential, that is an output second gear. The third essential is a transitive connection to a reaction base for the force that changes the path pattern of the first gear teeth 8. In this detail, the third gear, transitive connection to the housing 83, via swivels 12–20 provides the aforesaid third essential.

Figure 14:
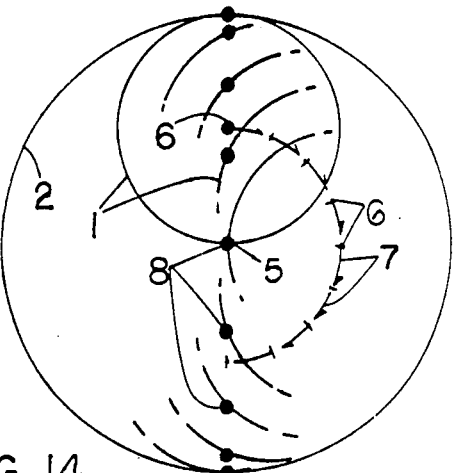

FIG. 14, Sheet 11: Indicates the geometrical mechanics of a first gear tooth reciprocating on a second gear diameter.

Figure 15:
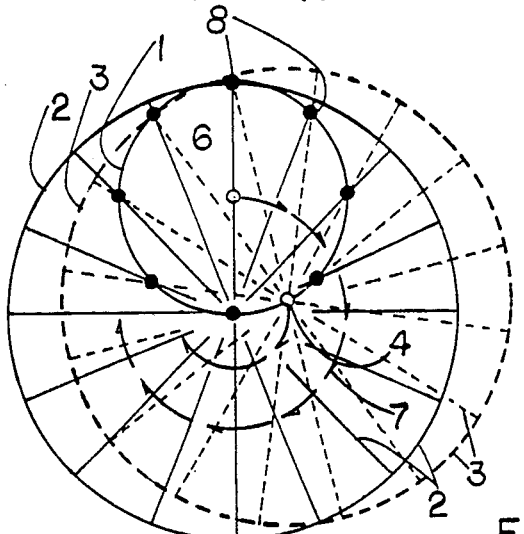

FIG. 15, Sheet 11: Shows how the first gear teeth reciprocate on the diameters of the second gear and the third gear at the same time, while the first gear axis 6 and the third gear axis 4 rotate around the second gear axis 5.

Figure 16:
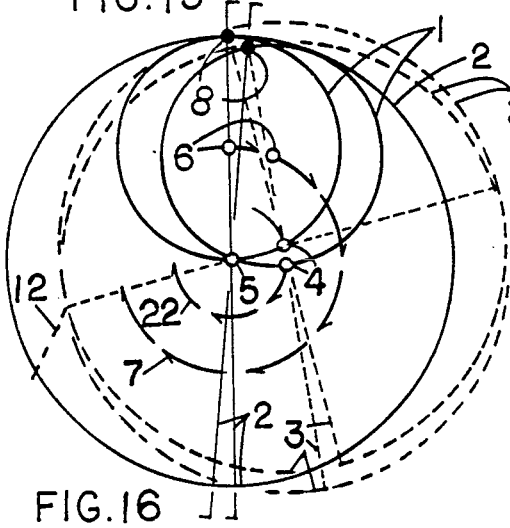

FIG. 16, Sheet 11: Shows how the output second gear and the tooth guiding third gear rotate the same on their respective axis, while the second gear axis is fixed and the third gear axis is moving on orbit 22.

Figure 17:
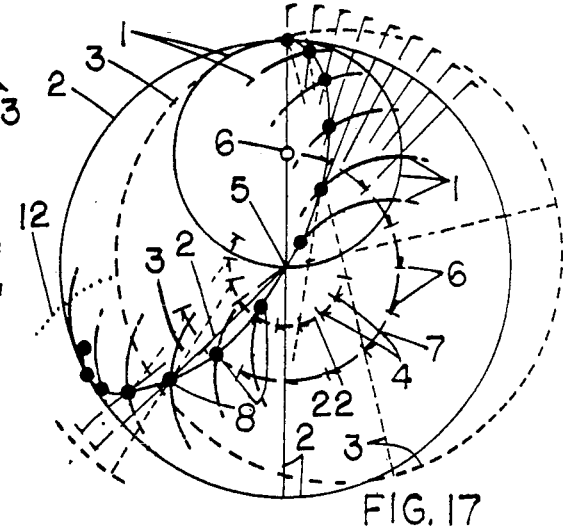

FIG. 17, Sheet 11: Is a flow diagram, with all the tangible factors of the transmission plotted at 22.5 degree intervals. The detail indicates how the path pattern of a first gear tooth correlates with the rotating ratio between the input driven axis 6 on orbit 7, and the input driven axis 4 on orbit 22, and the output driving second gear 2.

Figure 18:
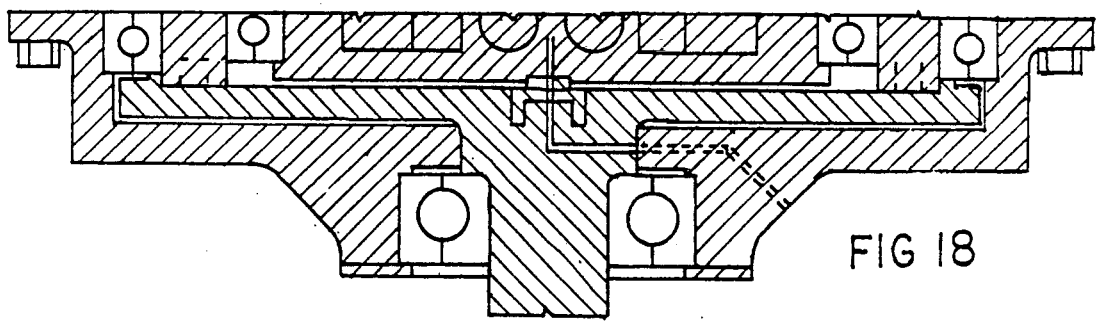

FIG. 18, Sheet 3: Shows a variation of the preferred embodiment that does not include the overdrive gearing.

FIG. 19, Sheet 12: Shows a variation, having two first gears.

FIG. 20, Sheet 13: Shows a variation that omits all fluid action. The drawing is an axial section.

FIG. 21, Sheet 14: Shows an axial section of variation C. Variation C omits all of the third gear mechanics and provides transmission ratios, accordingly, to the load.

FIG. 22: Shows a pump and a high and low pressure reservoir, as related to the fine binary valves that are indicated in the preferred embodiment.

FIG. 23, Sheet 15: Shows in detail a variation of the first gear and the second gear that includes numerical variation and also the use of track rollers for the first gear teeth.

FIG. 24, Sheet 2: Indicates a variation design of the swivels.

FIG. 25: Indicates a combined manual and programmed operation of a preferred embodiment.

A DISCUSSION OF THE INVENTION ACCORDING TO THE COMBINATIONAL FUNCTION OF EACH NUMBERED PART

Part Number 1, the First Gear

Shown in the preferred embodiment having axially disposed teeth, equipped with friction reducing sleeves. The unique gearing between the input driven first gear and the output driving second gear provides high load bearing strength, because more than one-half of the first gear teeth are meshed at any time, and the third gear load opposes the second gear load, thereby neutralizing any shear stress on the teeth. Said first gear teeth are confined to reciprocate on the diameters of the second and third gears and these ring gears 2 and 3 remain still, in the neutral mode, while their axes, 4 and 5 remain aligned. But, when third gear axis 4 moves away from axis 5, however slight, to form orbit 22, and the third gear is restricted by swivels 12–20 and restrictor 21 then, output second gear 2, must rotate, at its pitch circle, a distance that is approximately the distance that axis 4 moves on orbit 22, during a coexistent time. Whereas, the reduction and torque at this point of transmission is related to the difference in the size of orbit 22 and the size of the pitch circle of the second gear 2. The torque load on carrier 32, from driving the first gear axis 6, on orbit 7, is diametrically distributed by the multipurpose gears 24, 25 and 26. The multipurposes will be discussed elsewhere.

The variation shown in FIG. 19, sheet 12 indicates how a plurality of first gears may be implemented and the teeth 8 may be track rollers in lieu of studs with sleeves. The variation is discussed in detail on another sheet.

Part Number 2, the Second Gear

Is integrated with a cylinder shaped unit that is driven at one end by the first gear, and is driving the output shaft at the other end via the overdrive pinions 27. The second and third gears always rotate slower than the first gear. For example: the input shaft may rotate several hundred times while the second gear rotates once, and generates torque accordingly, within the limits of the machine strength. The machine strength is increased substantially by use of the restrictor, which is discussed elsewhere. With the strength provided, the phenomenal reduction and torque that the system can generate, between the first and second gears, allows practical use of the overdrive pinions to steplessly increase the transmission range. The variation shown in FIG. 12, sheet 3, omits the overdrive pinions, in lieu of a direct connection between the second gear and the output shaft. This arrangement is best for heavy, off-the-road equipment. The variation shown in section 19, sheet 12, indicates the use of a second gear with two sets of teeth driven by two first gears.

Part Number 3, the Third Gear

Is another ring gear that is sometimes called the channel guide. Section 4 shows this guide in the neutral mode and section 3 shows its axis 4 moving on orbit 22 because the third gear axis rotates on orbit 22 during a forward mode. The third gear rotates counter clockwise, relative to its own axis, but, the sprag action of swivels 12–20 does not permit counter clockwise rotation, as related to the housing. Since teeth 8 are confined to diameters of the second and third gears, and the third gear, reverse rotation, as related to the housing, is restricted by swivels 12–20 and restrictor 21, any input motion curves the path of teeth 8 relative to the housing, and the output second gear must drive forward accordingly.

Variations A and C omit this third gear, along with its coordinate parts that include swivels 12–20 and control unit 9. The third gear is part of the machinery that provides a positive mechanical drive from the input to the output.

Part Number 4, the Third Gear Axis

Reference to the axis is essential to the geometrical discussion of the invention in all variations except A and C. When this axis is aligned with axis 5 the second and third gears remain still, in the neutral mode, while teeth 8 reciprocate on their diameters. When axis 4 moves away form axis 5, to form orbit 22, then the output second gear rotates a distance that is approximately the distance that axis 4 moves on orbit 22. Thus, occurs the reduction and generation of torque. Axis 4 is moved radially by oil pressure on pistons 29.

Part Number 5, the Fixed Central Axis of the Transmission Unit

All teeth 8 cross this axis. It is also the axis of the input shaft, the output shaft, the second gear, the control unit and orbit 22.

Part Number 6, the First Gear Axis

Is driven on fixed orbit 7 by the input driven carrier 32. Crank 33 is rotatably connected here, to assist in driving control unit 9.

Part Number 7: the Fixed Orbit of Axis 6

Part Number 8, the First Gear Teeth

Occur at the pitch circle of the first gear. These teeth are equipped with sleeve bearings. In FIG. 12, sheet 3 a variation shows teeth 8A to be track rollers.

Part Number 9, the Control Unit

Provides means for the stepless change of ratio that includes the radial movement of axis 4. This unit is rotated at input speed by a special connection to the first gear via crank 33. This unit comprises pistons 29, slide block 41, cylinder block 40, and slide block housing 45. Operator controlled oil flows through line 30, to move pistons 29, which moves block 41, which moves axis 4 to determine the transmission ratio. This unit is one of the pieces omitted in variations A and C.

Part Number 10, Swivel Seat

Provides a fixed reaction seat for swivels 12-20, when clutch 11 is closed. When clutch 11 releases, the seat turns freely, thereby neutralizing the third gear action to allow a reverse drive if the restrictor is in the reverse mode.

Part Number 11, Clutch

When closed, the vehicle will not move backwards. When closed, the vehicle has a positive mechanical drive up to 1.5 to 1 overdrive and the seat will not prevent forward free wheel. The clutch should be open when the overdrive exceeds 1.5 to 1 overdrive. The overdrive range goes up to 3 to 1 overdrive. The clutch is released during the neutral and reverse modes by opening valve 74 to low pressure.

Parts Number 12 Through 20

Numbers each of 9 swivels as shown in the preferred embodiment. A purpose of the swivels is to provide a sprag action, as related to the housing, for the third gear that is guiding teeth 8. Section 5 shows the swivels in the neutral mode and any movement of axis 4 away from the working side 42, will seat swivel 12. The third gear, in section 6, rolls like a wheel, with the seated swivels being the grounded area. The working, or holding, swivels are near still, while the non-working swivels, on side 43 have lifted to ride the second gear, thereby eliminating the type friction that would occur in a ratchet and pall system. Although the rotation of the second and third gears is relatively slow, the main load-bearing dwell, on any swivel, is a split second. The place that the swivels bear rotates much faster than the actual swivel. At the instant the vehicle starts, the load on the swivels and the third gear, is less than the second gear load on teeth 8, and the load reduces to a minimal amount, in accord with the increase in inertial momentum. This preferred embodiment, as shown by section 9, sheet 1 of the attached drawings is a heavy duty design for large freight trucks, whereas the aforementioned starting load on the third gear and the swivels is highly modified by force from the restrictor 21. This force is discussed in detail in another part of this document. The lighter duty non-positive transmission, as shown in variations A and C, indicates that the swivels 12-20 and the third gear 3 may be eliminated.

Part Number 21, Restrictor

This unit comprises a pump 79, a turbine 78, and a stator 80. It generates torque, that is transmitted to the first gear 1 via the multipurpose gear 26, thereby modifying the mechanical output reaction load on the third gear 3, and swivels 12-20. This restrictor is neutralized, for the reverse and neutral modes, by opening valve 70 to low pressure, thereby releasing stator 80 via lock 68, while substantially reducing the restrictor oil volume.

The third gear 3 and swivels 12-20 provide for the positive mechanical drive, during the range from neutral up to 1.5 to 1 overdrive, while the restrictor modifies the load on them. During the range from 1.5 to 1 overdrive to 3 to 1 overdrive, the third gear 3 and the swivels 12-20 are neutralized, while the restrictor and the carrier driven axis 6 provide the input torque.

The restrictor generates more torque than a conventional converter because the gearing provides more difference between the pump speed and the turbine speed. For example: in the common ratio of 1 to 1, the pump is rotating 3 times as fast as the turbine. Extreme torque loads are put on the output second gear 2 by the overdrive gearing, pinions 27, in order to increase the transmission range and reduce the motion of the second and third gears. The aforesaid extreme torque load is well driven because of the phenomenal gear reduction and mechanical advantage provided by the diametrical movement of the input teeth 8 on the output second gear channel. That is, if the transmission leaves neutral into ratios that are near 300 to 1 underdrive, between the input and the second gear, the reduction and correlating torque at the output shaft 28, is still 100 to 1 underdrive. Thereby, relegating the transmission limits to material strength. The multiple meshes at the output shaft and the low friction multiple meshes of teeth 8 with the second and third gears, provide ample strength to carry said extreme loads. The reaction load, on the swivels, from teeth 8, via the third gear guide channels, would be nearly the same as the teeth 8 drive on the output second gear 2, except, the restrictor puts a constant clockwise force on teeth 8, via gear 26, thereby substantially modifying the load on the swivels and the third gear guide channels. The use of the restrictor 21 in combination with a third gear 3, is for heavy duty power transmission. Variation B uses the third gear method, only, and variations A and C uses only the restrictor 21. As the ratio progresses, higher, the load on the swivels reduces until the ratio reaches 1.5 to 1 overdrive, whereas, there is no load on the swivels. And, the restrictor, along with the input driven axis 6, provides the drive, up to 3 to 1 overdrive, that is the highest driving ratio. Due to the high torque load on the second gear 2, caused by the overdrive pinions, the restrictor torque cannot override the positive mechanical drive of the swivels.

A basic difference in the present restrictor and a conventional torque converter is that the conventional torque converter transmits all of the input drive to the output by fluid dynamics. But, in the restrictor, fluid dynamics transmits a part of the input drive while the first gear axis 6 is connected to and mechanically driven by input shaft 31 to provide another part of the input drive. When the restrictor is implemented in the preferred embodiment, fluid dynamics provides a smaller fraction of the power transmission, due to the mechanics of third gear and its supporting swivels. In variation B the restrictor is omitted entirely.

In other words, the restrictor provides a force that restricts counter clockwise rotation of the first gear teeth 8, but the mechanically driven first gear axis 6, provides the diametrical motion of teeth 8, that is a factor in the generation of extremely high output torque. The light duty variations A and C, which omits the third gear 3 and its supporting mechanics, rely on the restrictor and the input driven axis 6 to change the path pattern of teeth 8, to change the ratio. The restrictor action produces far more torque than a comparable action of a conventional torque converter. For example, at a 1 to 1 ratio, the restrictor pump is rotating three times as fast as the turbine, but the conventional torque converter's lack of torque in the high ratios, has been so problematical that the later model vehicles lock the engine and the output together, in the high ratio. This is a tradeoff, because any arrangement, in automobiles, that does not include a stepless variation of ratio, in accord with the output load, is grossly inefficient. This lack of proficiency of the conventional power transmission systems is well known to those skilled in the art.

The first purpose of restrictor 21 is to take up the overdrive when the positive mechanical drive ceases at 1.5 to 1 overdrive, and continue the ratio increase up to 3 to 1 overdrive. The second purpose is to modify the compression stress on swivels 12-20, during very low ratios, while maintaining a positive, non-slip mechanical drive. The swivels provide a static reaction base for the third gear channel guides that guide teeth 8, and also restrict the counter clockwise rotation of the first gear 1. The restrictor places a clockwise force on teeth 8 via gear 26, thereby modifying the load on swivels 12-20, and the third gear. As the transmission ratio goes higher the load on the swivels decreases until zero load occurs at 1.5 to 1 overdrive.

The power train from the input shaft to the output second gear 2, is split into several tributaries that includes the orbiting drive of first gear axis 6, by the input driven carrier 32, and the input driven rotation of control unit 9, that participates in the driving of axis 4 on orbit 22, and the reaction force of pistons 29 that holds axis 4 on orbit 22, and the reaction drive from seat 10 and housing 83, to the guiding channels of the third gear 3, via swivels 12-20, and the force from the restrictor 21 that participates in the drive. The structural principle of the restrictor is similar to that of a conventional torque converter: but, the generated torque, here, is used to directly restrict the rotation of teeth 8, as opposed to the conventional converter's purpose, of driving the output. Consequently, the select name is restrictor, as opposed to converter. The restrictor is shown graphically in the drawings, as a conventional element, without unnecessary detail. Although a pump, turbine, and stator are the basic parts, the conventional design variations, for this element are boundless.

Part Number 22, Orbit of Axis 4

The diameter of this variable orbit relates to the transmission ratio. The third gear axis 4 is radially moved by pressure on pistons 29. The diameter of this orbit, which may be infinitely small, divided into the pitch diameter of the second gear, is related to the ratio, whereas transmissions, large enough to minimize the machining tolerance may hold ratios such as 1000 to 1 underdrive, or smoothly increase the ratio up to overdrives that are limited only by material strength. This orbit 22 is essential to a positive mechanical transmission, as shown by section 9, sheet 12.

Part Number 23, Truck Bearing

The one way clutch bearing, with the inner race on the input carrier, and the outer race on the output driving second gear. In other words, this prevents the second gear from rotating faster than the carrier. The result is free forward wheeling during forward ratios up to 3 to 1 overdrive, to smooth the positive mechanical drive. This combination also allows a desirable type of automatic throttle breaking at the ratio of 3 to 1 overdrive.

Part Number 24, Main Reverse Gear

Occurs on the first gear 1 shaft, and meshes with gear 26 to provide the reverse mode, when gear 26 is locked via lock 69. Lock 11 releases seat 10 to neutralize the third gear, during the reverse mode. The driving mesh of the reverse mode is diametrically distributed between the main reverse gear 24 and the minor reverse gear 25, and the gears are connectively meshed by gear 26

Part Number 25, Minor Reverse Gear

See Part Number 24 above. Also, these two gears transmit force from restrictor 21, via multipurpose gear 26, to restrict the counter clockwise rotation of teeth 8, to change their path pattern. During this time the lock 69 is released.

Part Number 26, Multipurpose Ring Gear

When this gear is locked in place, by lock 69, it provides the static reaction to reverse the drive on the output second gear 2, via the above-mentioned gears 24 and 25. This gear is fastened to the turbine side of restrictor 21, and transmits a fluid force from the restrictor, that restricts counter clockwise rotation of the first gear teeth 8, while the first gear axis 6 is connected to, and mechanically driven, by the pump side of restrictor 21. When the transmission is in a forward or neutral mode, the lock 69 is released and gear 26 rotates slowly forward.

Part Number 27, Overdrive Pinions

The steplessly changing, and the extremely low ratios, 300 to 1 underdrive, that are inherent to the present invention, make it practical to extend the transmission range, up 3 to 1 overdrive, by implementing these overdrive pinions 27. Various factors are provided to carry the increased load on the internal parts. These factors are discussed, in detail, at other places in these specifications.

Part Number 28, Output Shaft

A variety of output designs are indicated in the drawings, which include the output shaft united with a shaft gear, and another design, with the output shaft fixed solidly to the second gear cylinder.

Part Number 29, Control Pistons

These are activated by operator controlled oil pressure that flows through the housing 83, via line 71, on into the cylinder block 40. The action of these pistons moves the third gear axis 4 away from the center of the transmission. Low pressure on these pistons together with springs 38 moves the third gear back into the neutral position. The position of these pistons is directly related to the transmission ratio at a coexistent time.

Part Number 30, Housing Tube

Part Number 31, Input Shaft

Is part of the same piece that forms pump 79, in variations A and C. This piece fastens to carrier 32 with bolts 89 to form a solid unit that carries gears 1, 24, 25 and 88.

Part Number 32, Carrier

Discussed at Part Number 31, above. Also fastens to drive block 94 that participates in driving crank 33 at input speed, regardless of the position of axis 4.

Part Number 33, Crank

Provides a driving input connection to control unit 9. The crank is connected to the input drive in a manner that rotates the control unit 9 the same as that of the carrier 32, regardless of the position of axis 4. The crank is driven by it's connection to the first gear 1 at axis 6, and by teeth 8 at torque track 95, and by teeth 8 meshing with the third gear 3, channels, and by the corrugated fitting of grooves 93 to drive block 94. The crank has an internal driving connection to slide block 41 that has 30 degree play, as shown in section 10.

Part Number 34, Park Lock

As shown in section 8, one-half turn of the lock fastens the transmission in the park mode. The one-half turn meshes the lock with output shaft gear 102, and stops against an overdrive pinion 27.

Part Number 35, Housing Assembly Bolts

Fastens the two headed housing together.

Part Number 36, Swivel Pin

The movement between a pin 36 and a swivel 12-20 is minimal and oscillating. The pin bears a variable and fleeting load during approximately 30% of an input revolution. The intangible location of the load rotates with the speed of the input. A function of the restrictor 21 is to modify the load on these pins.

Part Number 37, Second Gear Output Bearing

Section 9 shows how the second gear is a multipurpose cylinder shaped unit with the present bearing supporting the output end. Although the bearing is a large bore type, the action is no more than the output shaft bearing 65, because the second gear rotates one third as fast as the output shaft 28.

Part Number 38, Swivel Springs

Presses the swivel into the tire 46 an instant before the driving load compression occurs. As shown in section 6, with the transmission in the forward mode, the swivels on the working side 42 are seated, under compression, and nearly still, while the swivels on the non-working side 43 have lifted, and ride the second gear via swivel fulcrum 82. This is an action that occurs during each input revolution. Whereas, the present springs 38 provides a tightness and fidelity of contact that is necessary to prevent noise and maintain the reaction efficiently.

Part Number 39, Second Gear Cylinder Slots

A basic function of the present invention, is the objective restriction of the rotation, of the first gear 1, by anti-friction means. The embodiment, shown in FIG. 9, sheet 1, uses a method for this that allows the restricting swivels 12-20 to extend through the second gear cylinder, via the present slots 39, to the fixed reaction seat 10.

Variations, as indicated by detail, eliminates the entire combination, containing the third gear 3, the swivels and swivel seat, the slots and the entire control unit, and executes the aforesaid restriction via the single action of restrictor 21.

The slots are included in the preferred embodiment because of the sprag action, as related to the housing, of the load bearing swivels.

Methods of accomplishing the aforementioned restriction are many and may use ratchets and one way clutches, in lieu of the methods shown in the drawings.

Part Number 40, The Cylinder Block

Is part of the control unit 9. This block is bolted to slide block housing 45 to provide rotatable support for radially movable slide block 41, and block 40 is aligned with and rotatably connected to output shaft 28. This block carries the oil flow through line 30, that moves slide block 41.

Part Number 41, Slide Block

As shown in section 7, slide block 41 is radially movable by force from pistons 29. Section 9, sheet 1 shows that the present slide block shaft carries, on one end, the third gear shaft 77. In Section 10 it is shown that there is 30 degrees play between the driving crank 33 and the driven block 41. This allows pistons 29 to remain approximately 90 degrees off of a line from axis 6 to axis 4, regardless of the position of axis 4. This 90 degree disposition of pistons 29 is not a critical factor. Rather, it contributes to the efficiency of the pressure in line 30. It is seen in Section 10 that torque is transmitted to the present block 41, from crank 33, when the transmission is in the neutral mode. This prevents the would-be adverse effects of quick-starting unit 9. When the transmission is in the forward mode, unit 9 is rotated by the input driven crank 33, that binds to the block 41 shaft, because it orbits around a different axis than that of crank 33.

Part Number 42, Working Side

Reference to this number indicates the side of the transmission that swivels 12-20 descend and seat on tire 46 to provide the reaction force that is necessary to the transmission method that is indicated by the preferred embodiment that is shown in Section 9, sheet 1.

Part Number 43, Non-Working Side

Is indicated on the side of the transmission, where the swivels depart from their seat on tire 46 and ride on the second gear cylinder. Although the second gear and the third gear turn together, at constant velocity, during a ratio, the swivels stand still and bear on the working side, while they catch up on the non-working side. This is due to the variable angular disposition of the swivels that also determines the length of cylinder slots 39.

Part Number 44, Third Gear Gear Groves

These grooves are a design factor that provides lateral support for swivels 12-20 and also allows them to fold in for compactness.

Part Number 45, Slide Block Housing

One of the control unit parts that bolts to cylinder block 40, with bolts 85, to form a supporting and rotatable housing for slide block 41.

Part Number 46, Seating Tire

Is a rubber-like piece, fastened to seat 10, for purposes that include noise prevention. Also, the tire compresses slightly to distribute the reaction load among three or four swivels. Any swivel, in the working area 42, that is not under compression, is coexistently driven into bearing position by springs 38. The plasticity of the tire allows springs 38 to force the swivels to indent the tire, before the compression load occurs. The swivels are comparable to a nine tooth gear, multiplied by an underdrive ratio, and the tire smoothes and dampens this function of the transmission. For example: in a 10 to 1 underdrive ratio the swivels would act on the output second gear, like a gear with 90 teeth.

Part Number 47, Output Revolution Signal

One revolution of the second gear 2 indicates three revolutions of the output shaft 28. The signal, together with a clock, provides the data for a dashboard speedometer, and part of the data for computer aided vehicle operation.

Part Number 48, Input Revolution Signal

This, together with signal 47, provides data that indicates the transmission ratio, in the preferred embodiment. Signals 47 and 48 indicate the transmission efficiency when applied in the non-positive drive variation, shown in section 19. sheet 12.

Part Number 49, Input Head

Fastens to tube 30 and output head 92, to make housing 83.

Part Number 50, The Input Shaft Bearing

The input shaft is solidly fastened to carrier 32, and this bearing 50 shares a bearing load with bearing 55.

Part Number 51, First Gear—Minor Bearing

Shares a load with bearing 54. Parts 31 and 32 are solidly bolted together and provides alignment.

Part Number 52

Refers to the two bearings that support gear 25.

Part Number 52, Multi-Purpose Ring Gear Bearing

Although this is one of the large bore bearings, the action here is minimal, because both races of the bearing, turn in the same direction at nearly the same RPMs.

Part Number 54, Major Bearing Of The First Gear 1

Shares a load with bearing 51.

Part Number 55, Carrier Bearing

Shares a load with bearing 50. This bearing 55 is a large bore bearing, but the action is modified because both races rotate in the same direction. That is: the bearing action is related to the difference in the input RPMs and the second gear RPMs. As the ratio goes up, the bearing action goes down, until the ratio reaches 3 to 1 overdrive, and there is no bearing action at all.

Part Number 56, Input Side Second Gear Bearing

Shares a load with the output side second gear bearing 85. Although these are large bore bearings, the slow rotating second gear, turns one third the RPMs as that of the output shaft 28, so the second gear bearing action is about the same as the output shaft bearing 28.

Part Number 57, Input Side Swivel Seat Bearing

Part Number 58, Output Side Swivel Seat Bearing

These bearings, 57 and 58, rotate one third the RPMs as the shaft bearing 65, when the transmission is in the forward mode. During the reverse mode, both races rotate with the second gear cylinder, so there is no bearing action at all.

Part Number 59, Crank Bearings

The carrier rotates the control unit 9 via a three part combination that includes a torque drive on track 95 by teeth 8, a torque drive from carrier teeth 93 to crank teeth 75, and a crank action from the first gear 1 to crank 33, that is rotatably supported by crank bearings 59. This three part combination drives axis 4 on orbit 22, regardless of the radial position of axis 4 on orbit 22, and also maintains axial alignment between axis 4 at the control unit 9 and axis at the carrier 32.

Part Number 60, Teeth Sleeves

The load on tooth 8 from the second gear is in the opposite direction as that of the load from the third gear. Whereas, each tooth 8 is equipped with two friction reducing sleeves that rotate in opposite directions. The aforesaid relates to the preferred embodiment, as shown in section 9 and section 3, but, as shown by the variation in section 19, sheet 12, anti-friction designs may include roller bearings and track rollers.

Part Number 61, The Third Gear Bearing

Occurs between the third gear shaft and the crank shaft to provide rotatable support for axis 4.

Part Number 62, Control Unit Bearing

The action of this large bore bearing is modified, because both races rotate in the same direction, and the bearing action is related to the difference in the input RPMs and the second gear RPMs. As the ratio goes higher the bearing action decreases, until there is no bearing action at all, when the ratio of 3 to 1 overdrive occurs.

Part Number 63, Alignment Bearing

Maintains a rotating alignment between the control unit 9 and the output shaft gear 98, to support the action of seals 104.

Part Number 64, The Overdrive Pinion Bearings

Together with lugs 97, supports pinions 27.

Part Number 65, Output Shaft Bearing

Provides radial and lateral support of the output shaft 28.

Part Number 66, The Balance Gear

Is fastened to the minor reverse gear 25, and meshes with the output second gear, standard teeth part 67. The mesh between gears 66 and 67, provides a diametrical distribution of the input drive on the output.

Part Number 67, Second Gear Standard Teeth Part

This part diametrically balances the input drive on the output second gear cylinder.

Part Number 68, Stator Lock

When valve 70 is opened to high pressure, this unit locks the stator 80 in place, to generate torque for the forward mode. When valve 70 is on low pressure, the lock releases for the neutral and reverse modes.

Part Number 69, The Reverse Lock Piston

When high pressure is on this piston, via valve 73, the multipurpose ring gear 26 cannot rotate, thereby becoming a static reaction for gears 24, 25, 66 and 1.

Parts Number 70, 71, 72, 73 and 74

Refer to the binary valves and their oil lines. This discussion of the five valves is in context with the preferred embodiment, because variation B has only four valves, and variations A and C have only three valves. These variations are covered in another place in these specifications. Each valve may open to high or low pressure, according to signals from computer 112. When valve 70 opens to high pressure, for the forward mode, high pressure oil flows into restrictor 21, and stator lock 68, pressure locks stator 80 in place. Meanwhile, valve 73 is on low pressure, and multipurpose gear 26 is free to rotate and the static reaction seat 10, is locked in place by high pressure at valve 74.

Valves 70 and 72 are wired to the same signal, but they are always on opposite pressures. Whereas, valve 72 is now opened to low pressure, that provides a cooling oil flow from valve 70, across the transmission and out valve 72. The cooling oil leaves the restrictor, via the tight space between the pump and turbine, in a much smaller volume than the potential high pressure input at line 70, whereas, the restrictor passes cooling oil, but still remains full for the forward mode. High and low pressure at valve 71 are factors in the position of control pistons 29, that determines the transmission ratio. This valve is discussed at another place, and in context with the operator's control stick 101, as it pertains to the present preferred embodiment.

When valve 70 opens to low pressure, for the neutral mode, valve 72 opens to high pressure, that continues the cooling flow, but changes the direction, to a high pressure input from valve 72, across the transmission and out to low pressure, through valve 70. Although the cooling oil seeps into the restrictor, between the pump and the turbine, the low pressure output suction at valve 70, keeps the restrictor oil volume down, for the neutral and the reverse modes. Meanwhile, the low pressure at valve 70 has released the stator lock 68, and stator 80 rotates freely, in either direction, to further neutralize the restrictor 21. During the neutral mode, valves 71, 73 and 74 are opened to low pressure. Whereas, the low pressure at valve 71, allows the third gear axis 4 to align in the center, with axis 5, that is it's neutral position, and valve 73 frees gear 26, via lock 69, and valve 74 neutralizes the third gear mechanics, by releasing seat 10 via lock 11. When the transmission changes from neutral to the reverse mode, valve 73 changes to high pressure, to lock gear 26, via lock piston 69.

Part Number 75, Crank Teeth

These teeth 75, mesh with carrier teeth 93. All of the aforesaid teeth are milled on arcs around axis 6. This allows the input carrier 32 to deliver a smooth rotary drive to control unit 9, via the crank teeth 75, regardless of the radial position of axis 4.

Part Number 76, Drive Block Stud

Facilitates the assembly of block 94 that carries the driving teeth 93.

Part Number 77, The Third Gear Shaft

Carries grooves 44 and the third gear channel guides 3. This shaft carries the reaction force, from the swivels to the third gear channels that guide teeth 8.

Part Number 78, Turbine Vane

The output driving part of the restrictor. This turbine is fastened to the multi-purpose gear 26, that rotates slightly faster than the second gear, and the second gear can never rotate more than one third the RPMs than that of the output shaft 28. As an example: in the common ratio of 1 to 1, the turbine is rotating one third as fast as the input driven restrictor pump. Thereby, generating much more torque than a conventional torque converter, in a conventional transmission in the same ratio. The turbine and restrictor are designed relatively small, because its purpose is to assist in bearing the reaction load on swivels 12-20: but, not to override the positive mechanical drive, until the ratio goes higher than 1.5 to 1 overdrive. Whereas, the restrictor takes over the drive up to 3 to 1 overdrive. In other words, the transmission is in 3 to 1 overdrive before the restrictor ceases to generate torque.

Part Number 79, Restrictor Pump

In this present invention, the pump, and the restrictor, may be designed smaller than a conventional torque converter, in a comparable vehicle. Because, in the present invention, the first gear axis 6, is driven on orbit 7, by the carrier 32, that is fastened to the input shaft 28. This mechanical drive on axis 6 is the force that drives teeth 8 on the diameters of the second gear 2, and this is a large part of the total input drive. Therefore, a lesser part of the input drive is sustained by the fluid dynamics. In the preferred embodiment, that has a positive mechanical drive from the third gear mechanics, the funtion of the fluid dynamics is further reduced, and is not an essential part of the input drive. But, the restrictor is included here to cut-in for heavy duty power transmission.

Part Number 80, The Stator

The pump action, and the inertial effect, on the working fluid, increases the fluid velocity, by directing the fluid in a high frequency spiral around the pump axis. When the stator is rotating freely, in the neutral and reverse modes, most of the fluid energy is dissipated, centrifugally, into the restrictor walls. But when the stator is fastened to a static reaction seat via lock 68, the angle of the stator vanes changes the direction of the fluid and the frequency of the spiral path, and directs the fluid toward the turbine vanes, as opposed to the sides, and the turbine places a force on the multipurpose gear 26, that restricts the counter clockwise rotation of teeth 8.

Part Number 81, Stator Bearing

Part Number 82, Swivel Fulcrum

The third gear and the second gear rotate the same RPMs, but the third gear axis 4 also rotates on orbit 22. This causes the swivels to seat and lift, as opposed to the drag action of a ratchet system. Although each swivel acts only in it's respective slot 39, the seat and lift action is improved by these fulcrums. The fulcrums straddle the slots and provide more precise bearing for the rocker action. This constant contact of the swivels, and the springs and the pliant tire 46 prevents noise and smoothes the action.

Part Number 83, Housing

The housing comprises two heads, a middle tube and a fill block.

Part Number 85, Output Side Second Gear Bearing

A STRUCTURAL DESCRIPTION OF THE PREFERRED EMBODIMENT

REFER TO FIG. 1, SHEET 1 OF THE DRAWINGS

The present transmission has a housing 83, that is made with a housing tube 30, which is enclosed with an input head 49 and an output head 92. These heads are fastened to the tube 30 with bolts 35. The input head supports an input shaft 31 via bearing 50, and also supports the turbine side of a gear 26, via bearing 94. Another side of gear 26 is rotatably mounted on the inside of a second gear 2, via bearing 53. An input shaft 31 is fastened to a carrier 32 via dowel bolts 87, to form a solid unit, that rotatably supports gears 1, 24, 25, and 66. The solid unit also forms a pump part of a restrictor 21. The restrictor 21 comprises a pump 79, and a turbine 78, and a stator 80. The stator 80 is rotatably mounted on the input head 49 via a stator bearing 81, and held in place by a stator lock 68. The input head 49 has an oil passage line and a binary valve 70 that connects to a stator lock 68 and a restrictor 21. A second gear 2 is a cylinder shaped unit that is rotatably supported by housing 83, via bearings 56 and 85 and a furring block 84. A first gear 1 is rotatably mounted in carrier 32 and has axially disposed teeth 8, that are each covered with two sleeve bearings 60. The teeth are transitively connected to diametrically disposed second gear channels. A gear 24 is milled into the first gear shaft, and meshes with gear 26. A balance gear 66 is fastened to gear 25, and meshes with the standard tooth part 67 of the second gear 2. The first gear 1 is rotatably connected to a crank 33, and teeth 8 are transitively connected to crank 33. Carrier block 89 fastens to carrier 32 via studs 97, and carrier block teeth 88 are movably meshed with crank teeth 75. Crank 33 is connected to a control unit 9, via a slide block 41, that is movably fitted on a cylinder block 40, and a slide block housing 45. An output shaft 28 is rotatable supported by control unit 9 via bearing 63, and shaft 28 is further supported by the output head 92, via bearing 65. Control unit 9 is rotatably mounted on the inside of the second gear 2, via bearing 62. A third gear 3 and a third gear shaft 77 are rotatably mounted on crank 33 via a bearing 61. Swivels 12–20 are loosely connected to the third gear shaft at grooves 44 by swivel pins 36. Swivels 12–20 are laterally and transitively supported by slots 39 in the second gear 2. A seat 10 is rotatably mounted on the outside of the second gear cylinder via bearings 57 and 58. A tire 46 is fitted on the inner side of seat 10. The second gear 2 meshes with overdrive pinions 27 that are rotatably supported by studs 97 via bearing 64. A piston 11 and lock balls 99 are fitted into the housing tube 30 and an oil passage connects piston 11 to high and low pressure oil via binary valve 74. Another piston 69 and lock balls 100 are fitted into the housing tube 30, and an oil passage connects piston 69 to high and low oil pressure via binary valve 73. Pistons 29 are fitted into cylinder block 40 and an oil passage through head 92, connects these pistons to high and low pressure oil via binary valve 71. A cool oil passage occurs in head 92 and connects the inner transmission to high and low oil pressure via binary valve 72. Swivel springs 38 transitively connect the swivels to the third gear 3. The dashboard control mechanics, that can be implemented with this preferred embodiment, can vary, in design, from totally manual, to total automation, via computer control. In order to fully discuss the transmission operation, in another section, a dashboard control schedule is defined below, and it is seen that the control method is partly manual and partly automated via computer.

SEE FIG. 25, SHEET 14

An operator's dial 100 has a forward section 102, a neutral section 103, and a reverse section 104. The forward section has an incremented Miles Per Hour scale 108. A movable mounted mode and speed selector 101 is mounted on the operator's dial 100, and it is electronically connected to a computer program 112. An output RPM indicator 105 is movable mounted on the operator's dial 100, and it is electronically connected to an output RPM data source 113, and it is also electronically connected to the computer program 112. An input RPM indicator 106 is movably mounted on the operator's dial 100, and it is electronically connected to an input RPM data source 114, and the computer program 112.

A pump 115 is hydraulically connected to a high pressure reservoir 116 and a low pressure reservoir 117. The pump 115 is also connected to an electrical source 118. The high pressure reservoir 110 and the low pressure reservoir 111 are both hydraulically connected to each of a group of binary valves, that includes a valve 70, a valve 71, a valve 72 and a valve 73. The aforesaid valves are also electronically connected to the computer program 112, and the electrical source 118. Valve 70 is hydraulically connected to the restrictor 21 and the stator lock 68 via a valve 70. Valve 71 is hydraulically connected to a pistons 29. Valve 72 is hydraulically connected to a cool oil line. Valve 74 is hydraulically connected to a piston 69. Valve 73 is hydraulically connected to a piston 11. All of the aforesaid valves are electronically connected to the computer program 112, and the electrical source 118. Valves 70 and 72 are wired to be at opposite pressures at all times.

A DISCUSSION OF THE BASIC MECHANICAL GEOMETRICS OF THE PREFERRED EMBODIMENT, WITHIN REFERENCE TO DIAGRAMS 12, 13, 14, 15, 16, & 17, AS SHOWN ON SHEET 11 OF THE DRAWINGS

FIGS. 12 & 13

Show the input driven first gear 1, meshed with the output driving ring gear 2, and the third gear 3 channel guide, shown by dotted lines. The first gear teeth 8 are confined, immutably, to reciprocate on the diameters of the second and third gears. First gear axis 6 is driving on orbit 7, while the second and third gears remain still with their axis aligned to provide the neutral mode.

FIG. 14

Indicates the movement of axis 6 along orbit 7, by plotting it's position at 22½ degree intervals, and also, the correlating position of a tooth 8, when the second gear is still. Thereby, showing the geometric necessity that tooth 8 move on a straight line, relative to the second and third gears.

FIG. 15

Shows the third gear axis 4 moved away from second gear axis 5, and teeth 8 still meshed with and confined to the diameters of both the second and third gears. It is also seen that any movement of the input driven first gear axis will force the output second gear, or the third gear, or both, to rotate. It is seen here that the rotation of axis 6 on orbit 7 drives axis 4 on orbit 22, around axis 5.

FIG. 16

Indicates that axis 6 has driven 22½ degrees and rotated axis 4 on orbit 22, 22½ degrees accordingly. Diameter X is always aligned with axis 4 and 5. The terminal of diameter X is prevented from moving with axis 4, by swivels 12-20, resulting in the perimeter of gears 2 and 3 rotating a distance Z that is similar to the motion of axis 4 during a coexistent time.

FIG. 17

A continuation of the plotting, shown in FIG. 16, serves to plot a tooth 8 path pattern for a particular ratio that is also in correlation with the size of orbit 22.

OPERATION OF THE PREFERRED EMBODIMENT: IN THE NEUTRAL MODE

An engine output shaft is fastened directly to an input shaft 31 of the present invention. A computer program 112 electronically prevents the engine from starting, except, when the operator's mode stick 101 is in the neutral sector 103, of an operator's dial and mode stick 100.

The preferred embodiment is a heavy duty power transmission, and has a multi-path power train, .with parts that can be cut in or out, to provide three different power train arrangements. For example: the power transmission can occur at a restrictor 21, while the third gear 3 is neutralized; it can occur at the third gear 3 while the restrictor 21 is neutralized; or, the present transmission can carry extremely heavy loads, when both the restrictor 21 and the third gear 3 are working together, at the same time. The discussion, at this time, defines the arrangement that includes both the restrictor 21 and the third gear 3 working together at the same time, to provide a heavy duty power transmission.

With the engine and the valve pump 115 running, and the mode stick 101 in the neutral sector 103 of the dial 100, the computer program 112 signals for the activation of the neutral mode. Accordingly, valve 70 opens to low pressure, thereby releasing stator 80 to rotate neutrally and freely, and also reducing the fluid volume in restrictor 21, via low pressure line 70, to neutralize the fluid drive.

Meanwhile, valve 72 is opened to high pressure, according to the same neutral signal, from program 112, and cool oil flows through head 92 via line 72, and on across the transmission unit, to the tight space between the turbine 78 and the pump 79, where it flows on through, and out of the transmission via low pressure line 70. The tight space between the restrictor pump and turbine, doe not allow oil to flow into the restrictor as fast as it can flow out at the low pressure line 70, whereas the desired, low oil volume, in the restrictor, for the neutral mode, is maintained, while a degree of cooling circulation continues.

Meantime, the same neutral signal from the computer program 112, activates valve 71 to open to low pressure, that allows pistons 29 to remain seated in the neutral position. That is axial alignment of axis 5 and the third gear axis 4. An input driving carrier 32, is rotating the first gear axis 6 and a balance gear axis, on a fixed orbit 7, while first gear teeth 8, reciprocate in the diametrically disposed guide channels of the second and third gears, and the second gear 2 and the third gear 3 remain still, in the neutral mode.

At the same time, during the neutral mode, and according to the program 112, binary valve 73 is open to low pressure. Whereas, a multi-purpose gear 26 and turbine 78 rotate slowly in a clockwise direction, without driving. But, pump 79 is rotating at an input speed, via carrier 32, without transmitting any drive, because stator 80 can rotate freely, in both directions, and the restrictor fluid volume is below the driving level, because of the low pressure line 70.

Meanwhile, binary valve 74 is open to low pressure, according to the neutral signal from program 112. Although seat 10 is freed to rotate by this low pressure, it remains still, without purpose, during this neutral mode.

At the same time, an input driven carrier 32 and a first gear 1 are both rotating a control unit 9 via a unique and transitive connection to a crank 33. This transitive connection provides a three way drive that rotates the control unit 9, at constant input speed, regardless of the radial position of the third gear axis 4. This three way drive is comprised of a driving, but movable, connection between carrier teeth 88 and crank teeth 75 and, a constant but transitive drive on crank 33 from teeth 8 in crank track 95, and, a cranking drive, on crank 33 from its rotating connection to the first gear axis 6, that is input driven around its orbit 7.

The first gear axis 6 and the balance gear axis 120 are input driven on orbit 7 by carrier 32. The first gear teeth and the balance gear teeth rotate counter clockwise, the amount that is necessary for the teeth to reciprocate on diameters of the second and third gears while they remain still, in the neutral mode. The first gear 1, and the balance gear 66 are fastened to gears 24 and 25 that have smaller pitch diameters. These gears 24 and 25, mesh with the multi-purpose gear 26, thereby causing gear 26 and turbine 78, to rotate clockwise, slowly, with no driving effect, during the neutral mode.

In review of the neutral mode: the input driven carrier 32 rotates pump 79, axis 6, axis 120, crank 33, and control unit 9, in a clockwise direction at input speed, while all other parts remain still, in the neutral mode.

While the transmission is in the neutral mode, the program 112 will allow the mode stick 101 to be moved to the reverse sector 104 or the forward sector 102.

OPERATION OF THE PREFERRED EMBODIMENT: IN THE REVERSE MODE

The pitch diameters of gears 24 and 25 are slightly less than the pitch diameter of gears 1 and 66. So, when the second gear 2 is held still by the vehicle load, during the neutral mode, the aforesaid difference in pitch diameters, and teeth, forces the multi-purpose gear 26 to rotate forward, in a clockwise direction, approximately one-fifteenth the RPMs as that of the input driven carrier 32. When operator's stick 101 is moved into the reverse sector 104 of dial 100, the computer program 112 opens valve 73 to high pressure on piston 69, thereby stopping and holding gear 26 by ball clutching it to the housing 30. Whereas, according to the aforesaid gearing, the output driving second gear 2 must rotate counter clockwise, in reverse, approximately one-fifteenth the RPMs as that of the input driven carrier. That is: while gear 26 is held still, the second gear 2 is rotating in reverse, at the approximate ratio of 15 to 1 underdrive. The present design of the preferred embodiment includes the overdrive pinions 27, so, the input to output ratio, in reverse is approximately 5 to 1 underdrive.

The valve positions, in the reverse mode, is the same as that in the neutral mode, except: valve 73 is open to high pressure to hold gear 26. This valve 73 is open to low pressure during the neutral and forward modes.

The second gear 2 and the third gear 3 are transitively pinned together, by the first gear teeth 8, so, gears 2 and 3 rotate together, at the same RPMs, around their respective axis, but the low pressure at valve 74, allows the third gear 3 and the swivels 12-20 and seat 10, to rotate, slowly, in a reverse direction without any driving action, or purpose, during the reverse mode. Carrier 32, crank 33, and control unit 9, rotate at input RPMs during all modes. This prevents quick start shock, when the transmission begins to drive forward.

When the operator's speed, and mode stick, is placed on the line between the neutral sector 103 and the reverse sector 104, the program 112, signals valve 74 to alternate between high and low pressure, at a designed frequency, to provide a downhill brake action in the transmission.

OPERATION OF THE PREFERRED EMBODIMENT: IN THE FORWARD MODE

The forward mode of the present preferred embodiment provides a variety of driving dispositions. For example, a vehicle, standing, with the engine running, and the transmission in the neutral mode: the driver desires to accelerate, at the maximum rate, and to reach a speed of one hundred miles per hour and to maintain a steady speed while the output load varies. Whereas, a speed and mode stick 101 is pushed forward, all the way to the one hundred miles per hour mark on scale 108, in the forward sector of the operator's dial 100. When stick 101 enters the forward sector 101, all binary valves act according to the computer program 112, signals. Whereas, valve 70 opens to high pressure, to activate restrictor 21, by locking stator 80, and increasing the restrictor fluid volume, to the working stage. Restrictor 21 is a driving accessory, as opposed to a driving necessity. Valve 73 remains open to low pressure, so that gear 26 and turbine 78 can rotate in a clockwise direction. Valve 72 opens to low pressure, thereby allowing cooling oil to flow from high pressure at restrictor 21, through the tight space, between pump 79 and turbine 78, on across the transmission and out valve 72 to low pressure reservoir 117. Oil cannot flow out of restrictor 21 as fast as it can flow in at high pressure line 70, so, an operating fluid volume is maintained, in the restrictor, while the cooling circulation continues. Valve 74 opens to high pressure, to lock seat 10, thereby, activating the third gear 3 mechanics, by providing a static reaction base for the third gear sprag action, via swivels 12-20. Valve 71 opens high pressure on to pistons 29.

The transmission ratio changes, according to the change in the distance between the second gear axis 5 and the third gear axis 4, and the aforesaid distance is directly related to the position of pistons 29, and while valve 71 is opened to high pressure, there is a constant force via pistons 29, toward increasing the distance between axis 5 and axis 4, but, pistons 29 cannot push axis 4 into a ratio, other than the coexisting ratio between the engine input and the vehicle speed. In other words, the transmission ratio changes in simultaneous accord with the change in the ratio between the engine input and the vehicle speed. There is a mechanical connection between the engine and the vehicle wheels, except during forward freewheeling. This mechanical connection exists during all ratios, up to 1.5 to 1 overdrive. In ratios that are higher than 1.5 to 1 overdrive and on up to 3 to 1 overdrive, the third gear mechanics ceases to drive, and the output is then carried by the carrier 32 driving the first gear axis 6 around orbit 7, together with the turbine 78 force that restricts the counter clockwise rotation of teeth 8, via gears 1, 24, 25 and 26. The balance gear 66 is designed to provide a diametrically opposed input drive on the output second gear 2.

When the speedometer 105 aligns with the speed and mode stick 101 the computer program 112, changes valve 71 to low pressure, thereby, preventing the ratio from going higher. If the output load increases, the input RPMs is increased to maintain constant speed. To reduce speed, the input RPMs is reduced while stick 101 is pulled back to the desired speed indication.

If an extremely low speed is indicated by the position of speed stick 101, such as one mile per hour, the present transmission can provide this, but conventional combustion engines cannot limit the input enough to be fully efficient, unless there is a degree of output torque load, such as mud, hill, etc.

In conventional power transmission, wheel spinning occurs when the vehicle's inertial resistance to a sudden change in velocity is greater than the resistance of the tire traction. The present stepless transmission provides extreme acceleration, without tire spinning, by neutralizing the vehicle's inertial resistance via stepless change of the transmission ratio and stepless velocity change of the vehicle. With favorable terrain and wind conditions, the present transmission can drive an ordinary vehicle up to three hundred (300) miles per hour.

To drive in mud or snow, or up steep inclines, where conventional power transmission vehicles cannot go, the mode stick 101 is placed at a very low speed mark on scale 108, and the ratio will remain extremely low, accordingly. And, if the input RPMs are increased without moving stick 101, the ratio goes lower. Change in the input RPMs can change the ratio, unless stick 101 is moved. The mode stick 101 can be moved anywhere, except reverse, on dial 100, at any time and any speed, while the engine is running. The mode stick can be moved from neutral into reverse at zero output RPMs. When pressure on pistons 29 moves the third gear axis 4, radially, away from axis 5, then, axis 4 is input driven, clockwise, The third gear 3 is prevented from rotating counter clockwise, relative to the housing 83. The counter clockwise rotation is prevented by swivels 12-20, reaction from the statically locked seat 10. This geometrical connection forces the third gear 3 to rotate clockwise, at its pitch circle, a distance that is approximately equal to the distance around orbit 22. That is to say, if the diameter of orbit 22 is one-fourth that of the second gear diameter, and axis 4 is input driven, 360 degrees on orbit 22, then gears 2 and 3 must rotate, clockwise, approximately 90 degrees, as related to the housing 83. In other words: in this example, the input rotates one revolution, 360 degrees, while the output driving second gear 2, rotates about 90 degrees.

The input driving first gear teeth 8 are transitively confined to the diametrically disposed third gear guide channels, and the teeth are also transitively confined to the diametrically disposed guide channels of the output driving second gear 2. These gears 2 and 3 are transitively pinned together by the first gear teeth 8, and gears 2 and 3 always rotate together, at the same RPMs, around their respective axis 5 and 4. The output driving second gear 2 is rotating 90 degrees while the input driven third gear axis 4 orbits 360 degrees, thereby providing a 4 to 1 underdrive, reduction, between the input and the second gear 2. The 3 to 1 overdrive pinions 27, increases the ratio between the input shaft 31 and the output shaft 28 to a 4 to 3 underdrive. A stepless change in the size of orbit 22, steplessly changes the input-output ratio.

In FIG. 5, sheet 5, of the drawings, it can be seen that the reaction load on the third gear, from teeth 8, would be similar to the force on the second gear, from teeth 8. Except, a fluid based clockwise force, on teeth 8, from the restrictor turbine 78 via gears 1, 24, 25, 26 and 66 substantially modifies the load on the third gear, the swivels and seat 10 with its tire 46, while placing an additional force toward driving the output second gear 2.

A positive mechanical drive from the engine to the vehicle wheels, occurs in all ratios, up to 1.5 to 1 overdrive. Any engine roughness is dampened, in the present transmission, by its forward free wheel character together with the fluid accessory force from turbine 78.

Power transmission between the input driven first gear 1 and the output driving second gear 2, occurs at the transitive, or rolling, contact between teeth 8 and the second gear channels. The motion of teeth 8 is confined to straight line diameters of the second gear 2. But, a curving path pattern of teeth 8, as related to a fixed reference, housing, is related to the input-output ratio. For example: when teeth 8 are reciprocating on straight lines, relative to the housing, the mode is neutral. But, during the highest ratio, the teeth circle around axis 5. A very slight arcuate curve of teeth 8, can rotate the output second gear, one degree, while the input shaft 31 rotates 360 degrees. And if output resistance is sufficient, torque can be generated, in inverse proportion to the RPM ratios. The present preferred embodiment, implements two units to steplessly change the path pattern of teeth 8. These units are a restrictor 21 and a third gear 3.

FIGS. 12 through 17, sheet 11 show how the path pattern of teeth 8 are steplessly changed by the guide channels of the third gear 3 to steplessly change the input-output ratio.

Refer Now to FIG. 5, Sheet 5

More specifically, refer to the tooth 8 on the bottom side of the first gear 1, that is marked by the number 8. It is already known that tooth 8 is confined to movement on the straight line diameter of the second gear 2, relative to the second gear 2. It can be clearly seen here that if the third gear 3 is prevented from rotating counter clockwise, as related to a fixed reference, by the swivels 12-20 seating on the tire 46 of seat 10 that is fixed to the housing 83, then the output driving second gear 2 must rotate clockwise, forward.

Balance: Referring to FIGS. 6 and 7, Sheet 6

During the neutral and reverse modes, all moving parts are in diametrically balanced rotation, but in the forward mode, the third gear axis 4 orbits around the central axis 5, at input revolutions, in a clockwise direction, while the third gear 3 rotates on this axis 4 in a counter clockwise direction, but the pitch circle of the third gear is pinned to the second gear 2 by teeth 8 and both the second gear and the third gear rotate clockwise, together, relative to the housing. And, this rotation of the third gear, is one-third the RPMs as that of the output shaft 28. Referring specifically to FIG. 7, this aforesaid action is similar to the dynamics of a rolling wheel, because the non-working side 43 is moving twice as fast as the orbiting axis 4 while the working side 42 is relatively still. Whereas, the centrifugal pull caused by direction change at the non-working side is counter balanced by the velocity changes that occur on the working side 42.

Noise: Still Referring to FIGS. 5 and 6

The only parts of the present preferred embodiment that lift and seat are the swivels 12 through 20. Although the bearing end of the swivels lift and seat, the rocker design of the swivels, the fulcrum studs and the springs 38, keep the swivels in bearing contact at all times. The swivels gradually descend to bearing position on the pliant tire 46. The only purpose of springs 38 is to prevent the swivels from rattling. When a swivel is bearing, the direction of the load on the inner side is the same as the coexistent direction of axis 4, so it can be seen that the load stress on the bearing swivels is pure compression, and the springs 38 has no function other than to tighten the swivels. The swivels will seat and bear without the springs or the fulcrums, but the hydraulic currents cause an audible click that is remedied by the springs 38.

In review: the preferred embodiment is a heavy duty transmission, having a stepless range from neutral to 3 to 1 overdrive. The transmission is capable of driving in ratios lower than 150 to 1 underdrive. The extreme internal material stresses caused by this unusual reduction and generation of output torque, is carried by the substantial increase and distribution of the load bearing points in the power train, and the absence of shock loads, due to the stepless ratio change.

DIAMETRICAL GEARING

The present diametrical gearing is quite different in mechanical principle than that of conventional gearing. When input driven planet gear teeth, in the present invention, are rotating an output driving ring gear, while they are reciprocating, immutably, on diameters of the ring gear, many new and desirable gearing arrangements, and functions, are made available. For example: a typical and conventional gearing arrangement of an automobile transmission involves internal planet gearing that multiplies the input turbine torque three or four times to provide the lowest reduction, and generate the maximum output torque. Of course, this limited low gearing also limits the use of overdrive gearing. On the other hand, the present invention, using diametrical gearing, and a simple two gear arrangement, can multiply the input torque more than a hundred times, thereby permitting extreme overdrive gearing, that can extend a stepless range from neutral to more than three to one overdrive at the output shaft. Another example of the superiority of the diametrical gearing system is that the planet gear axis may be driven, on its orbit, directly, by the engine shaft, while the planet gear axially disposed teeth are restricted by the input turbine, to provide a stepless change of ratio, in variations A and C. Due to this, and the extreme reduction that can occur at the diametrical mesh between the planet gear teeth 8 and the output ring gear 2, a very small part of the power train goes through the fluid connection between the pump and turbine, as related to that of a conventional automatic transmission. Yet another example of the exceptional ability of the present diametrical gearing is the load bearing potential of the power train. In the preferred embodiment, and variation B, literally all of the planet gear teeth 8 are drivingly meshed at all times. In variations A and C at least half of the planet gear teeth are drivingly meshed at all times. And, the driving teeth can address the driven ring gear 2 at various angles that provides extreme mechanical advantage. But, in the gearing of conventional transmission all gear driving occurs in a tangential direction and no reduction occurs except the reduction that is related to the difference in gear sizes. Also, the load bearing strength at the mesh between any two gears is limited to the beam strength of one or two teeth. In other words, a single planet gear working in the present diametrical gearing system, will carry more load than several comparable planet gears in a conventional gearing system.

IN REVIEW OF DIAMETRICAL GEARING a direct mechanical input drive, from the engine, rotates the planet gear axis 6, on its fixed orbit 7, in a clockwise direction. The planet gear 1 is meshed with an output ring gear 2, and this mesh tends to rotate the planet gear in a counter clockwise direction, around its axis 6, while the planet gear teeth 8 reciprocate on diameters of the ring gear. Restriction on the rotation of teeth 8 tends to curve their path, and the diameters of the output ring gear, must rotate accordingly. Diametrical gearing can provide more reduction and torque with two gears than it is practical to attempt, in conventional gearing, with any number of gears.

VARIATIONS

The three elements that are essential to the function of the present invention are: 1) an input driven PLANET GEAR with teeth reciprocating on a diameter of; 2) an output driving RING GEAR and; 3) a COMPONENT to restrict the rotation of the planet gear teeth.

That is:

1) A PLANET GEAR
2) A RING GEAR
3) A RESTRICTOR

All three essential elements may vary in number and arrangement to provide an endless variety of transmission designs within the scope of the invention. Of course, an input planet gear with conventional spur gear teeth reciprocating on diameters of an output ring gear could be included in variations. But, it is characteristic of a conventional spur gearing mesh, that only one or two teeth provides all of the drive for a mesh during any point in time. In the preferred embodiment of the present invention, all of the axially disposed teeth are driving at all times, in order to carry the extreme loads that occur from the phenomenal reduction that is provided by the present unique system. In variations A and C, at least one-half of the axially disposed teeth are driving at any time, and all teeth remain in driving contact at least half of the time. In the preferred embodiment and variation B, all of the axially disposed teeth are driving all of the time.

An essential function of the invention is the confinement of the input planet gear teeth to movement on a straight line that is a diameter of the output driving ring gear 2. This straight line motion is immutable, as related to the ring gear 2. When the motion of the planet gear teeth 8 is also on a straight line, as related to a fixed reference, there can be no rotary drive put on the output ring 2 so the transmission is in the neutral mode. The other essential function of the invention is to curve the path of teeth 8 as related to a fixed reference, thereby forcing the output ring gear 2 to rotate, to maintain the immutable status of teeth 8 confinement to the ring gear diameters. The rotation of the output ring gear 2 is related to the curve of the input driven planet gear teeth 8, as related to a fixed reference. An example: the slightest curve of teeth 8, as related to a fixed reference, forces gear 2, with extreme leverage, to rotate accordingly. This method of power transmission, while using a simple device, provides a stepless ratio change, along with more reduction than any gearing method ever recorded in the annals of the power transmission art.

VARIATION A

Variation A, as related to the preferred embodiment, omits the entire third gear 3 mechanics. This includes carrier block 89, crank 33, control unit 9, third gear 3, swivels 12-20, seat 10, tire 46, piston 11, balls 99, bearings 57, 58, 62, 59, and 61, valves 74 and 71, and other minor supporting parts, such as springs 38. Although the omission of the third gear mechanics minimizes the elements of the invention, it gives up the positive mechanical driving aspect of the invention as provided by the third gear mechanics of the preferred embodiment. Although part of the drive train in Variation A is fluid connected, it is far more efficient than any conventional power transmission, especially where the conventional torque converter is used. A conventional automobile power transmission, using a torque converter, can multiply the input turbine torque 3 or 4 times with its internal gear reduction, to provide the highest output torque, necessary for functions such as starting the vehicle. In Variation A of the present invention the input power train comprises a positive mechanical input drive to rotate the axis A6 of the two planet gears A1 and A1A on orbit A7, and, restrictor A21 provides a force to curve the planet gear teeth A8. Reduction occurs between the input and the output, by and according to the path of teeth A8. A very slight curve in the path of teeth A8 can multiply the input torque of the input turbine A78 by more than a hundred times. Inversely, a very slight input torque from the input turbine A78 will start the vehicle moving. Since the ratio change in Variation A is stepless, and is load oriented, very little inertial load occurs. If the output load increases, the path of teeth A8 will naturally evolve toward straighter patterns, and lower the transmission ratio accordingly, and the operator may increase the input RPMs to maintain constant speed. That is, the variation A is automatically in the highest ratio that is drivingly compatible with the output load and the input power. As shown in FIG. 19, sheet 12, variation A indicates how a plurality of the first essential element may be implemented.

The first essential element is sometimes called the first gear 1, and sometimes an input planet gear 1. In FIG. 12 these two gears are marked A1 and A1A. Variation A also shows a transmission design, without overdrive pinions, and the highest input to output ratio is 1 to 1. Although the restrictor A21 appears to be similar to a conventional torque converter, the implementation of the two is quite different. In the conventional torque converter, the turbine contains all the drive between the input and the output. But, the restrictor A21 of the present invention restricts the counter clockwise rotation of teeth A8, as opposed to driving, while the engine input shaft provides a direct mechanical drive to rotate the axis A6 of the planet gears A1 and A1A. Another important difference in the conventional converter and the present restrictor is that the restrictor turbine turns much slower as related to the pump than the converter turbine. This occurs in the variations with overdrive gearing.

VARIATION B

Variation B is similar to the preferred embodiment except that the restrictor 21 is omitted here. All parts in variation B have corresponding parts in the preferred embodiment, and go by the same names. The counter clockwise rotation of the input driven planet gear 1, around its own axis 6, is restricted by a reaction force from the housing tube 30, via seat 10, swivels 12-20 and the third gear guide channels. Referring now to FIG. 7, sheet 6, the third gear axis 4 is shown, pushed away from axis 5, and driven along its orbit 22, by input forces. In this variation B there is a positive mechanical connection between the engine and the vehicle wheels, except when the vehicle free-wheels away from the drive. When a first gear tooth 8 moves in the diametrically disposed channels of the second and third gears, the mechanics is similar to a wedge action. In other words, if a tooth 8 moves 10 millimeters on a second gear diameter, while the second gear pitch circle moves 1 millimeter in a tangent direction, then the input torque is multiplied 10 times at the second gear. The stepless radial movement of the third gear axis 4 steplessly increases the transmission ratio as fast and as smooth as the vehicle's inertial resistance is converted into momentum. The transmission ratio, and ratio between the engine and the vehicle wheels, changes simultaneously. This is why phenomenal acceleration can occur without spin-scratching the vehicle's tires. If no other force, except the input drive, intervened, then all points on the third gear 3 would move on an orbit that would be exactly the same size as orbit 22 of the third gear axis 4. But, a reaction force form the housing does intervene when the sprag action of swivels 12-20 blocks any counter clockwise motion, as related to the housing 83. A transitive point on the working side 42 of the third gear 3, that is in line with axis 4 and axis 5, is always held still by swivels 12-20, at the instant that the alignment occurs. This geometrical arrangement forces an outer terminal point of a third gear diameter to rotate approximately the same distance that axis 4 moves on its orbit 22, during a coexistent time. The side where this hold action is occurring is called the working side 42 and the opposing side of the transmission is called the riding side 43. Since the third gear diameter is forced to rotate, and the first gear teeth 8 is confined to movement on the third gear diameter, then teeth 8 must curve, as related to a fixed reference. And, since the third gear cannot rotate counter clockwise, because of swivels 12-20, then the output second gear 2 must rotate clockwise, a distance that is similar to the distance that axis 4 moves on orbit 22 during a coexistent time. That is to say: if the diameter of orbit 22 is one-tenth the diameter of the second gear 2, then the output second gear 2 will rotate thirty-six degrees while the input shaft 31 rotates 360 degrees and the input torque is multiplied by ten at the output second gear 2. The aforesaid transitive point, that is held still at the instant, is materially intangible and moves at input RPMs, tangible second and third gears rotate one-third the RPMs as that of the output shaft 28. Whereas, the internal motion of the transmission system is relatively slow.

VARIATIONS C

Parts of variation C have corresponding parts in the preferred embodiment, and variation C reference numbers are the same as those in the preferred embodiment, except that the prefix C is added to each number.

A STRUCTURAL DESCRIPTION OF VARIATION C

Variation C is enclosed with a cylinder shaped housing C83 that comprises a central tubing part C30 and an input head part C49 and an output head C92. This three piece housing C83 is bolted together with bolts C93. The input head C49, supports a rotatably mounted input shaft C31 via bearing C50, and the input shaft C31 is fastened to, and part of carrier C32 that is rotatably mounted on the second gear C2, via bearing C55. Gears C1, C24, C25, C66 are rotatably mounted in carrier C32. The pump C79 is milled into the input face of the carrier C32. The turbine side C78 of restrictor C21 is connected to gear C26 that is rotatably mounted on housing C83 and the second gear C2, via bearings C53 and C94. Gear C26 meshes with gears C24 and C25. Gears C25 and C66 are fastened together and are supported by axle C120. The first gear C1 is fastened to gear C24 and they are both supported by bearing C51 and C54. Balance gear C66 meshes with gear C67, that is fastened to, and part of the second gear C2. Split piston and lock balls C69 are set in housing tube C30. The first gear C1 is diametrically meshed with the second gear C2, that is rotatably supported by bearings C57 and C37. The output shaft C28 is rotatably supported by bearings C65 and C63. Overdrive pinions C27 are rotatably mounted on studs C84 of the head C92, via bearings C64. Stator C80 is rotatably mounted on housing head C49. Stator lock piston is set in head C49. Binary valve C70 is hydraulically connected to restrictor C21 and stator lock C68. Binary valve C72 is hydraulically connected to the transmission interior. Binary valve C73 is hydraulically connected to lock piston C69.

An endless variety of computerized driving programs, with different degrees of automation, may be consistent with the present invention. For example: in variations A and C, the ratio changes automatically and simultaneously with the input RPMs. The transmission automatically and steplessly seeks the highest ratio for any combination of input RPMs with the output load. The operator's dashboard equipment for variation C requires only three buttons: reverse, neutral and forward along with a conventional accelerator.

A vehicle is started in the neutral mode, and when forward is indicated by the forward button, the vehicle will move, regardless of the lowest of input RPMs, because of the extreme reduction that is provided by the reciprocation of teeth 8 in the second gear channels. As the input RPMs increase, the transmission ratio moves simultaneously, and steplessly, through infinitely low ratios up to the highest ratio permitted by the output load. The increase in input RPMs in correlation with the stepless evolvement of the transmission ratio provides a very desirable driving performance. If the output load permits, the transmission can continue driving up to 3 to 1 overdrive. The overdrive pinions C27 make the extremely low ratios that are inherent to the present system more practical.

The only binary valves that are required, for the operation of the variations A and C, are valves 70 and 72, for cooling and to neutralize the restrictor C21, during the reverse and neutral modes. And, valve 73 for the reverse and downhill brake modes. The forward mode signal activates the restrictor C21 by increasing it's oil volume and locking the stator lock C68, via opening valve 70 to high pressure. A small amount of cooling oil flows between the pump and the turbine, and on through the transmission and out the valve 72. But the larger flow through valve 70 provides the necessary volume build-up, in the restrictor, to provide the forward mode.

IN REVIEW

The preferred embodiment, and variation B, implements a positive mechanical drive, as opposed to fluid dynamics, and the input-output ratio correlates with the position of the third gear axis 4, that further correlates with the position of pistons 29. Because of this, the stick and dial method, shown elsewhere, is indicated as the control method for the preferred embodiment and variation B.

Here, in variations A and C, a very slight force on teeth 8 will cause the vehicle to creep, because of the extreme torque multiplication that occurs at the second gear channels. Whereas, a neutral button signals a neutral mode that opens valve 70 to low pressure and valve 72 to high pressure. Valves 70 and 72 work opposite and under the same signal. The low pressure on line 70 releases stator C80 via lock c68 and also decreases the restrictor oil volume to provide the neutral mode.

During this neutral mode the reverse button may signal valve 73 to open to high pressure and lock gear C26 via piston C69 to provide the reverse mode. The reverse mode is fully mechanical and is not driven by the restrictor C21.

The forward signal button opens valves 72 and 73 to low pressure, and valve 70 to high pressure, to lock stator C80 via lock C68. Also, to increase the restrictor oil volume. The stepless and efficient increase in forward input-output ratios is automatic because the system inherently seeks the highest ratio that is drivable by the coexistent input torque. The engine accelerator steplessly controls the transmission ratio, for a given load, at the same time that it changes the input RPMs.

It is emphasized here that the various pressure locking devices 69, 68 and 11 have no similarity to the multiple friction clutches that are inherent to the conventional planetary type power transmissions. The conventional clutches engage during high speeds and must rub to dampen the shock that is caused by large gaps between the driving ratios. The locks 69, 68, and 11 of the present invention engage when the parts are relatively still, and they are designed to hold on contact as opposed to the rubbing contact of the conventional clutches.

A conventional power transmission is extremely inefficient for a variety of reasons, one of which is the category now being discussed. Conventional transmission provides a few input-output ratios, with large steps, or gaps, between the ratios. The conventional ratio change across the gaps is managed by extreme input power glut, and after the high ratio drive is reached, it is rare indeed, when the input power efficiently correlates with the output load. Since the vehicle cannot be driven with too little power, it is almost always the case that too much combustion energy is not converted into mechanical energy. Rather, it is dissipated into air pollution and high temperature.

OPERATION OF VARIATION C

Input shaft C31 is connected directly to the power source and is fastened to carrier C32. This shaft-carrier unit is supported by the input head C49 and the second gear C2, via bearings C50 and C55. The carrier rotates the first gear axis 6, and gear C66 axis, on a fixed orbit C7. The carrier is fastened to, and drives, the pump C79 at input RPMs. Power from pump C79 and stator C80 is transmitted via fluid medium to turbine C78 that is fastened to multipurpose gear C26. The gearing indicates that gear C26 rotates about one-third the RPMs as that of the output shaft C28, and during the low starting ratios, the difference in the pump RPMs and the turbine RPMs is extreme, so the torque factor of the pump power is substantially increased at the slow turning turbine C78, and consequently, at the multipurpose gear C26. This increased torque, at gear C26, tends to restrict the rotation of the teeth of gears C66 and C1, around their respective axis, via meshing contact with gears C24 and C25, that are fastened to the aforesaid gears C66 and C1. That is, gears C66 and C1 are driven at their axis, around the fixed orbit 7, by a direct mechanical input drive, and also restricted at their teeth by a fluid generated torque from turbine C78, via gears 24, 25, and 26. The diametrical gearing, between the first gear teeth C8 and the diametrical channels in the second gear C2, is similar to the corresponding gearing in the preferred embodiment. But, here, the path pattern of teeth C8, as related to the housing, is changed by the force resulting from the mechanically driven axis C6 coupled with the turbine force on teeth C8, and the third gear 3 mechanics is omitted. The aforesaid resulting force, together with the output load, as registered at the second gear C2 channels determines the path patterns of teeth C8 to determine the input-output ratios. In other words, the input-output ratio, and the stepless change of the ratio, is load oriented. For example: if the load is such that the aforesaid forces on teeth C8 and axis C6 can curve the path of teeth C8 only one degree, away from a straight line, relative to the housing, while the input shaft C31 makes a full 360 degree revolution, then the output second gear C2 must rotate one degree to provide a ratio of 360 to 1 underdrive between the input and the output second gear C2. Since this variation C has the 3 to 1 overdrive gearing at pinions C27, the actual ratio between the input shaft and the output shaft is 120 to 1 underdrive. As the output load reduces, relative to the input power, the path of the teeth C8 evolves toward more elliptical, rounded patterns as the input-output ratio goes upward. The stepless range of this variation C, design, is from neutral to 3 to 1 overdrive. If the load increases, the path of teeth C8 will steplessly evolve toward more arcuate, straighter patterns as the input-output ratio moves steplessly, toward lower ratios as required by the load, and the input is increased to maintain constant speed.

I claim:

1. A steplessly variable power transmission, comprising:
    a input driving means, including a first gearing means, having a plurality of teeth, in rotation, around an axis, and
    a means to guide said teeth, on a plurality of paths, that includes a plurality of straight paths, as related to
    an output driving second gearing means and a plurality of curved paths, as related to;
    a housing, and said curved paths, being selectively and steplessly changed by said means to guide said teeth, and the stepless changing of the curved paths, steplessly varies an input to output ratio, thereby providing a steplessly variable power transmission.

2. A steplessly variable power transmission, according to claim 1, wherein, said means to guide said teeth, includes:
    a third gear, having a movable axis, and a plurality of diametrically disposed channel guides, and the third gear having
    a means to prevent it from a reverse movement, as related to the housing, during a forward driving mode, and the first gear teeth meshing with the second and third gears at a coexistent time, and the movable axis, being input driven on a variable orbit, that correlates with a coexistent input to output ratio, and
    a means to steplessly change the variable orbit, to steplessly vary the input to output ratio, and provide a steplessly variable power transmission.

3. A steplessly variable power transmission, according to claim 2, wherein, said means to prevent it from a reverse movement, includes:
    a plurality of swivels, loosely connected at a first end, to the third gear, and transitively bearing on
    a swivel seat, at a second end, to provide a sprag action on the third gear, and the swivel seat, selectively fastened, to the housing, during a forward driving mode, by
    a hydraulically motivated clutch, and the clutch, releasing the seat, to rotate freely, during a reverse driving mode.

4. A steplessly variable power transmission, according to claim 2, wherein, the means to change the variable orbit, includes:
    a hydraulically motivated piston, contacting
    a radially movable slide block, that is set in
    a rotatably mounted slide block housing, and the third gear being rotatably mounted on the slide block, and the third gear axis being held away from a second gear axis, by the piston, to provide a forward driving mode, and the slide block housing, having
    a connection means, to a input driven first gear, to rotate the slide block housing and provide the variable orbit, of the third gear axis, and the piston, selectively and steplessly changing the orbit to selectively and steplessly vary an input to output ratio, and provide a steplessly variable power transmission.

5. A steplessly variable power transmission, according to claim 1, wherein, said input driving means includes:
    a input driven restrictor, containing a volume of hydraulic fluid, reacting on a fixed stator, and the restrictor having an input driven pump, that is driving a turbine, via a fluid connection, and the turbine being geared to the first gearing means, in a manner, that restricts the rotation of the teeth, to supplement a guiding action, of a third gear channel guide, for a heavy duty power transmission, and the fixed stator, having
    a means to release and rotate freely, to allow a neutral and a reverse driving mode.

6. A steplessly variable power transmission, according to claim 1, wherein, said output driving second gearing means, includes:
    a rotatably mounted cylinder, diametrically geared, at a first end, to,
    an input driven planet gear, and driving,
    a further output means, at a second end.

7. A steplessly variable power transmission, according to claim 6, wherein, said further output means, includes: an arrangement of overdrive gearing.

8. A steplessly variable power transmission, according to claim 1, wherein, said input driving means, includes:
    an input shaft, fastened to,
    a rotating carrier, that is mounted on a roller bearing, on an inside surface of,
    an output driving second gear cylinder, and the carrier is supporting a plurality of rotatably mounted gears, that includes,
    a first planet gear, having axially disposed teeth, diametrically meshing with channels in the output driving second gear, and the first gear is fixed to,
    a reverse gear, that meshes with,
    a multipurpose ring gear, that is selectively fastened to the housing during a reverse driving mode, by,
    a hydraulically motivated clutch, and the clutch, releasing the ring gear, to rotate freely, during a forward driving mode, and the rotatably mounted gears, supported by the carrier, further includes,
    a balance gear, to provide a diametrically opposed drive, on the output driving second gear cylinder, and the balance gear being geared to the multipurpose ring gear, to take off power from the first gear.

9. A steplessly variable power transmission, comprising,
    an input driving means, including a first planet gear, having a plurality of axially disposed teeth, in rotation around a first planet gear axis, and,
    an output driving means, including: a second output driving ring gear, having a plurality of diametrically disposed channels, and the first gear teeth reciprocating in the channels, and the first gear teeth moving on a plurality of straight paths, as related to, a housing, during a neutral driving mode, and the teeth moving on a plurality of curved paths, as related to the housing, during a forward driving mode, and;

a means to steplessly change the curved paths, to steplessly vary an input to output ratio, and provide a steplessly variable power transmission.

10. A steplessly variable power transmission, according to claim 9, wherein, said input driving means, includes:

an input driven restrictor, that is steplessly and variably, restricting the rotation of the first gear teeth, and the output driving second gear, having a variable output load, that is opposing the restriction, of the rotation of the first gear teeth, and the plurality of first gear teeth, moving on a plurality of curved paths, as determined by a balanced opposition between the input drive and the output load, and the plurality of curved paths, correlating with a coexistent input to output ratio, that is the highest ratio that is drivable, by the input drive, at the instant, and the curved paths, steplessly changing, toward lower ratios, according to an increase in the coexistent output load, and the curved paths, steplessly changing, toward higher ratios, according to an increase in a coexistent input drive, thereby providing a steplessly variable power transmission, having an automatic, load oriented, ratio variation.

11. A steplessly variable power transmission, according to claim 10, wherein, said input driven restrictor, includes: a volume of hydraulic fluid, and a releasable stator, and an input driven pump, that is driving a turbine, via a fluid connection, and the turbine being geared to the first gear, in a manner, that restricts the rotation of the first gear teeth, during a forward driving mode, and the restriction occurs, according to a balance, between the input drive and the output load, thereby, steplessly and automatically changing the plurality of curved paths, to steplessly and automatically change the input to output ratio, according to the output load, and provide the highest drivable input to output ratio, according to the input drive, at the instant, and, a fluid pressure motivated clutch means, selectively fixing the stator to a housing, during a forward driving mode, and a high fluid pressure means, holding a pressure on a full fluid volume in the restrictor, during a forward mode, via a programmed means, and the programmed means, releasing the stator, and reducing the fluid volume, during a neutral mode and a reverse mode.

12. A steplessly variable power transmission, according to claim 9, wherein, a means to provide a reverse driving mode, includes: an input driven first gearing means, having a first part, meshing with the output driving second gearing means, and a second part, meshing with;

a multipurpose ring gear, that is fastened to the housing by;

a hydraulically motivated clutch, and the second part of the input driving gear, having a smaller pitch diameter than the first part, thereby, rotating the input driven first gear, at a relative speed, that rotates the output driving second gear, in a reversed direction, and the clutch releasing the multipurpose gear, to rotate freely, during the forward mode.

13. A steplessly variable power transmission, according to claim 9, wherein, the input means, including the input driving first planet gear, having a plurality of axially disposed rollers, for input teeth, and the output means, including the output driving second ring gear, having a plurality of straight, diametrically disposed, channels for output teeth, and the rollers driving and reciprocating, in the channels, and multiplying a torque factor, of the input drive, according to a difference, in the motion, of the input teeth, and the output teeth, and the difference in the motion, of the input teeth, and the output teeth, correlating with a coexisting plurality of paths, of the plurality of input teeth, and the plurality of paths, correlating with a coexisting input to output ratio, and a means to steplessly change the plurality of paths of the plurality of rollers to steplessly vary the output driving torque, as related to the torque factor of the input means, and to steplessly vary a input to output ratio, and provide a steplessly variable power transmission.

14. A steplessly variable power transmission, according to claim 9, wherein, the first planet gear, having a plurality of axially disposed rollers, for input teeth, and the output second gear, having a plurality of diametrically disposed channels, for output teeth, and at least half of the input teeth, being in driving contact, with output teeth, at any instant, during a forward driving mode, and a difference in motion, between input teeth and output teeth, during the driving contact, is related to a difference in input driving torque and output driving torque, and the means to steplessly vary the curved paths, correlatively and steplessly varies the difference in motion, of the input teeth and the output teeth, through a large stepless range, including maximum differences, that generate extremely high output driving torque, to allow implementation of substantial and permanent overdrive gearing, such as a stepless range, that includes, 100 to 1 underdrive and 3 to 1 overdrive.

15. A steplessly variable power transmission comprising:

a means to steplessly increase a output driving torque, from zero torque, to at least one hundred times more, than an coexisting input torque, that includes, an input driven planet gear, having a plurality of teeth, being diametrically geared to, an output driving ring gear, and the plurality of teeth, reciprocating on a plurality of straight lines, as related to the ring gear, and the plurality of teeth, following a plurality of straight paths, as related to, a housing, during a neutral mode, and the means to steplessly increase the torque, includes a means to steplessly change the plurality of straight paths to a plurality of curved paths, to provide a forward drive, at the ring gear, according to the amount of curve in the plurality of curved paths, and the increase, in the output driving torque, over the input torque, being inversely related to the amount of curve in the plurality of curved paths, and the means to steplessly increase the output driving torque, includes a means to steplessly change the curved paths, to steplessly vary an input to output ratio and provide a steplessly variable power transmission.

16. A steplessly variable power transmission, according to claim 15, wherein:
a strength and bearing means, to increase the output driving torque, includes, all of the planet gear teeth being in driving contact, at all times, during the forward driving mode.

17. A steplessly variable power transmission, according to claim 15, wherein, a plurality of large bore bearings, having inner and outer races, being mounted between an inside surface of a slower moving, output second gear cylinder, and a plurality of faster driven input parts, and the inner and outer races, being rotated in a single direction, thereby modifying large bore bearing speed.

18. A steplessly variable power transmission, according to claim 15, wherein, a means to provide engine compression braking, while maintaining a desired degree of free-wheeling, for efficiency and smoothness, includes:
a one-way clutch bearing, being mounted between,
a carrier, that is directly driven by engine input, and the output second gear cylinder, thereby preventing the output cylinder from rotating faster than the carrier, and the cylinder, driving,
an output shaft, via,
a plurality of overdrive pinions, thereby, allowing free-wheeling, up to a designed overdrive speed, before the engine braking occurs.

19. A steplessly variable power transmission, according to claim 15, wherein, a means to implement the transmission driving modes, and cooling flow, includes:
a plurality of pressure motivated clutches, having hold and release positions, as determined by;
a plurality of binary valves, and the valves being connected to;
a high pressure reservoir, and;
a low pressure reservoir, and the valves being electronically activated, by;
a programmed computer, that is receiving input signals and output signals and load signals and operator signals.

20. A steplessly variable power transmission, according to claim 15, wherein, each particular one of the axially disposed teeth is confined to reciprocate in one particular second gear channel, to provide a wearin action, as opposed to a wearout action.

21. A steplessly variable power transmission, according to claim 15, wherein, the first gear teeth, have different lengths, and the second gear channels, have different depths, thereby, keeping the first gear teeth, in driving contact, with the second gear channels, for extended times, as related to a input revolution.

* * * * *